(12) United States Patent
Takenaka et al.

(10) Patent No.: US 10,850,767 B2
(45) Date of Patent: Dec. 1, 2020

(54) WORK VEHICLE AND CONTROL METHOD FOR WORK VEHICLE

(71) Applicant: KOMATSU LTD., Tokyo (JP)

(72) Inventors: Yuita Takenaka, Tokyo (JP); Masanori Ikari, Tokyo (JP); Masanobu Nakabayashi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 30 days.

(21) Appl. No.: 16/085,082

(22) PCT Filed: Aug. 25, 2017

(86) PCT No.: PCT/JP2017/030626
§ 371 (c)(1),
(2) Date: Sep. 14, 2018

(87) PCT Pub. No.: WO2018/038268
PCT Pub. Date: Mar. 1, 2018

(65) Prior Publication Data
US 2019/0084615 A1    Mar. 21, 2019

(30) Foreign Application Priority Data
Aug. 26, 2016  (JP) .................................. 2016-165944

(51) Int. Cl.
*B62D 5/26* (2006.01)
*E02F 9/26* (2006.01)
(Continued)

(52) U.S. Cl.
CPC ................ *B62D 5/26* (2013.01); *B62D 3/14* (2013.01); *B62D 5/065* (2013.01); *B62D 5/087* (2013.01);
(Continued)

(58) Field of Classification Search
USPC ........................................................ 701/41
See application file for complete search history.

(56) References Cited

U.S. PATENT DOCUMENTS 6,179,082 B1 *  1/2001  Ikari ........................ B62D 5/06
                                                          180/418
6,202,501 B1 *  3/2001  Ikari ........................ B62D 1/12
                                                          180/332
(Continued)

FOREIGN PATENT DOCUMENTS

| CN | 101421148 A | 4/2009 |
| CN | 101626940 A | 1/2010 |

(Continued)

OTHER PUBLICATIONS

The International Search Report for the corresponding international application No. PCT/JP2017/030626, dated Nov. 21, 2017.
(Continued)

*Primary Examiner* — James M McPherson
(74) *Attorney, Agent, or Firm* — Global IP Counselors, LLP

(57) ABSTRACT

A work vehicle includes a hydraulic actuator, a hydraulic pump, an operation member, a control valve, an angular velocity corresponding value sensing unit, a notification component, and a controller. The actuator changes a steering angle based on a supplied fluid. The pump supplies fluid to the actuator. The operation member is operated by an operator when the steering angle is changed. The valve controls flow of fluid supplied from the pump to the actuator based on an amount the operation member is operated. The sensing unit senses a corresponding value corresponding to a steering angular velocity changed based on the flow of fluid. The notification component notifies that the corresponding value has reached a threshold value preset based on an upper limit of the steering angular velocity. The
(Continued)

controller causes the notification component to perform a notification when it is detected that the corresponding value has reached the threshold value.

13 Claims, 23 Drawing Sheets

(51) Int. Cl.

| | | |
|---|---|---|
| *B62D 5/065* | (2006.01) | |
| *E02F 9/20* | (2006.01) | |
| *E02F 9/22* | (2006.01) | |
| *B62D 6/00* | (2006.01) | |
| *B62D 5/28* | (2006.01) | |
| *B62D 3/14* | (2006.01) | |
| *B62D 5/087* | (2006.01) | |
| *B62D 5/12* | (2006.01) | |
| *B62D 12/00* | (2006.01) | |
| *F15B 11/16* | (2006.01) | |
| *E02F 9/16* | (2006.01) | |
| *E02F 3/342* | (2006.01) | |

(52) U.S. Cl.
CPC .................. *B62D 5/12* (2013.01); *B62D 5/28* (2013.01); *B62D 6/00* (2013.01); *B62D 12/00* (2013.01); *E02F 9/2004* (2013.01); *E02F 9/2087* (2013.01); *E02F 9/225* (2013.01); *E02F 9/2232* (2013.01); *E02F 9/2267* (2013.01); *E02F 9/2296* (2013.01); *E02F 9/26* (2013.01); *F15B 11/161* (2013.01); *E02F 3/342* (2013.01); *E02F 9/16* (2013.01); *F15B 2211/605* (2013.01); *F15B 2211/7053* (2013.01); *F15B 2211/7107* (2013.01)

(56) References Cited

U.S. PATENT DOCUMENTS

| | | | |
|---|---|---|---|
| 2001/0004952 A1 | 6/2001 | Sorensen et al. | |
| 2004/0093139 A1* | 5/2004 | Wildey | B62D 12/00 |
| | | | 701/41 |
| 2008/0053741 A1* | 3/2008 | Forero | B62D 6/002 |
| | | | 180/418 |
| 2009/0084616 A1 | 4/2009 | Kezobo et al. | |
| 2010/0101888 A1 | 4/2010 | Nakamura et al. | |
| 2010/0322807 A1* | 12/2010 | Kimura | B62D 5/065 |
| | | | 418/30 |
| 2013/0068544 A1 | 3/2013 | Itou et al. | |
| 2014/0366521 A1 | 12/2014 | Tanaka et al. | |
| 2015/0308079 A1* | 10/2015 | Vigholm | F15B 21/14 |
| | | | 180/14.1 |
| 2016/0179128 A1* | 6/2016 | Guglielmo | B66F 11/04 |
| | | | 182/19 |
| 2016/0244091 A1* | 8/2016 | Oetken | B62D 6/00 |
| 2016/0319848 A1 | 11/2016 | Tanaka et al. | |

FOREIGN PATENT DOCUMENTS

| | | |
|---|---|---|
| CN | 102917942 A | 2/2013 |
| CN | 103917763 A | 7/2014 |
| CN | 205259250 U | 5/2016 |
| CN | 105848989 A | 8/2016 |
| JP | 11-105723 A | 4/1999 |
| JP | 11-321664 A | 11/1999 |
| JP | 2006-347212 A | 12/2006 |
| JP | 2007-106308 A | 4/2007 |
| JP | 2008-74393 A | 4/2008 |
| JP | 2009-26057 A | 2/2009 |
| JP | 2016-78642 A | 5/2016 |
| WO | 2014/097542 A1 | 6/2014 |

OTHER PUBLICATIONS

The extended European search report for the corresponding European application No. 17843744.8, dated Aug. 30, 2019.
The Office Action for the corresponding Chinese application No. 201780014695.0, dated Jan. 3, 2019.

* cited by examiner

WORK VEHICLE AND CONTROL METHOD FOR WORK VEHICLE

CROSS-REFERENCE TO RELATED APPLICATIONS

This application is a U.S. National stage application of International Application No. PCT/JP2017/030626, filed on Aug. 25, 2017. This U.S. National stage application claims priority under 35 U.S.C. § 119(a) to Japanese Patent Application No. 2016-165944, filed in Japan on Aug. 26, 2016, the entire contents of which are hereby incorporated herein by reference.

BACKGROUND

Field of the Invention

The present invention relates to a work vehicle and a method for controlling a work vehicle.

Background Information

A configuration of an articulated work vehicle has been disclosed in which the steering angle is varied by controlling the flow of fluid supplied to a hydraulic actuator disposed spanning a front frame and a rear frame (see, for example, JP-A H11-105723 and JP-A H11-321664.

The work vehicles in JP-A H11-105723 and JP-A H11-321664 are provided with a steering valve that adjusts the flow of fluid supplied to a hydraulic actuator according to an inputted pilot pressure, and a pilot valve that adjusts the pilot pressure supplied to the steering valve.

The pilot valve is provided with an operation input shaft and a feedback input shaft that can rotate relative to each other. The operation input shaft is linked to the joystick lever and rotates according to the rotation angle of the joystick lever. Also, the feedback input shaft is linked to the front frame by a link mechanism, and rotates according to changes in the steering angle.

This pilot valve adjusts the pilot pressure inputted to the steering valve according to the difference between the rotation angle of the operation input shaft and the rotation angle of the feedback input shaft. The flow of fluid supplied from the steering valve to the hydraulic actuator is varied and the steering angle is changed according to the adjusted pilot pressure.

In this pilot valve, the deviation angle of the operation input shaft with respect to the feedback input shaft is mechanically restricted to within a specific angle range, and the pilot valve is configured so that the joystick lever cannot be operated beyond this restriction angle.

On the other hand, when the vehicle body is to be bent, the operator rotates the joystick lever at a speed faster than the steering angular velocity of the vehicle body (in the case of an articulated type, this is also referred to as the bending speed), and increases the deviation angle between the vehicle body and the joystick lever. This allows the steering angular velocity of the vehicle body to be increased.

SUMMARY

However, there is an upper limit to the steering angular velocity of the vehicle body, and the position where the steering angular velocity reaches its upper limit is provided ahead of the restricted position of the joystick lever. Therefore, even though the steering angular velocity has reached the upper limit, the operator may not be aware of this, and may vainly attempt to operate the joystick lever to the restricted position.

In light of the above problem encountered in the past, it is an object of the present invention to provide a work vehicle and a method for controlling a work vehicle with which the operator can be given information related to the upper limit of the steering angular velocity.

In order to achieve the stated object, the work vehicle pertaining to a first aspect comprises a hydraulic actuator, a hydraulic pump, an operation member, a control valve, an angular velocity corresponding value sensing unit, a notification component, and a controller. The hydraulic actuator changes the steering angle on the basis of the supplied fluid. The hydraulic pump supplies fluid to the hydraulic actuator. The operation member is operated by the operator when changing the steering angle. The control valve controls the flow of fluid supplied from the hydraulic pump to the hydraulic actuator on the basis of how much the operating member is operated. The angular velocity corresponding value sensing unit senses a value that corresponds to the steering angular velocity that is changed on the basis of the fluid flow rate. The notification component notifies the operator that the corresponding value has reached a threshold value preset on the basis of the upper limit of the steering angular velocity. When it is detected that the corresponding value has reached the threshold value, the controller causes the notification component to perform notification.

Thus, if the threshold value is set to a value just short of the upper limit of the steering angular velocity, for example, the operator can recognize that the steering angular velocity is approaching the upper limit during a steering operation. Also, if the threshold value is set to a value at or just beyond the upper limit of the steering angular velocity, the operator can recognize that the steering angular velocity has been reached during a steering operation.

In this way, the operator can recognize information related to the upper limit of the steering angular velocity, such as that the steering angular velocity is near the upper limit or that the steering angular velocity has reached the upper limit, during a steering operation. Therefore, the operator will not push the operation member beyond this position, and unnecessary operation can be suppressed. In addition, since unnecessary operation can thus be suppressed, the operator does not use his hand muscles more than necessary, which reduces the toll on his body.

The work vehicle according to a second aspect is the work vehicle according to the first aspect, comprising a front frame and a rear frame. The rear frame is linked to the front frame at a connecting shaft portion. The hydraulic actuator is disposed on both sides of the connecting shaft portion in the vehicle width direction, and the steering angle of the front frame with respect to the rear frame is changed.

In an articulated work vehicle such as this, the operator can recognize information related to the upper limit of the steering angular velocity.

The work vehicle according to a third aspect is the work vehicle according to the first aspect, wherein the angular velocity corresponding value sensing unit senses a value related to the discharge flow rate of the hydraulic pump as the corresponding value. The threshold value is preset on the basis of the maximum discharge flow rate of the hydraulic pump at which the steering angular velocity reaches its upper limit. The controller causes the notification component to perform the notification when it is detected that the corresponding value has reached the threshold value.

When the discharge flow rate of the hydraulic pump increases, the steering angular velocity goes up, and when the discharge flow rate decreases, the steering angular velocity goes down.

Since the steering angular velocity thus varies with the discharge flow rate of the steering pump, information related to the upper limit of the steering angular velocity can be obtained by sensing the discharge flow rate of the steering pump.

The work vehicle according to a fourth aspect is the work vehicle according to the third aspect, wherein the angular velocity corresponding value sensing unit has a tachometer and a pump information sensor. The tachometer senses the speed of the engine of the work vehicle. The pump information sensor senses the angle of the swash plate or inclined shaft of the hydraulic pump. The value related to the discharge flow rate of the hydraulic pump is the angle of the swash plate or inclined shaft of the hydraulic pump. The threshold value is the threshold value of the angle of the swash plate or inclined shaft, which is preset on the basis of the angle of the swash plate or inclined shaft at which the discharge flow rate of the hydraulic pump reaches the maximum discharge flow rate with respect to the engine speed. The controller causes the notification component to perform the notification when the angle of the swash plate or inclined shaft sensed by the pump information sensor at the sensed engine speed reaches the threshold value.

Consequently, it can be determined that the discharge flow rate of the hydraulic pump has reached a threshold value preset on the basis of the maximum discharge flow rate by acquiring the angle of the swash plate or inclined shaft of the hydraulic pump and the engine speed, so information related to the upper limit of the steering angular velocity can be conveyed.

The work vehicle according to a fifth aspect is the work vehicle according to the third aspect, further comprising a steering valve. The steering valve adjusts the flow of fluid supplied from the hydraulic pump to the hydraulic actuator on the basis of a pilot pressure inputted from the control valve. The control valve controls the flow of fluid supplied from the hydraulic pump to the hydraulic actuator via the steering valve by adjusting the pilot pressure. The angular velocity corresponding value sensing unit has a tachometer and a load sensing pressure sensor. The tachometer senses the speed of the engine of the work vehicle. The load sensing pressure sensor senses the load sensing pressure in the steering valve. The value related to the discharge flow rate of the hydraulic pump is the load sensing pressure in the steering valve. The threshold value is the threshold value of the load sensing pressure preset on the basis of the load sensing pressure at which the discharge flow rate of the hydraulic pump reaches its maximum discharge flow rate with respect to the engine speed. The controller causes the notification component to perform the notification when the load sensing pressure sensed by the load sensing pressure sensor at the sensed engine speed reaches the threshold value.

Consequently, by acquiring the engine speed and the load sensing pressure at the steering valve, it can be determined that the discharge flow rate of the hydraulic pump has reached a threshold value preset on the basis of the maximum discharge flow rate, so the information related to the upper limit of the steering angular velocity can be conveyed.

The work vehicle according to a sixth aspect is the work vehicle according to the third aspect, wherein the angular velocity corresponding value sensing unit has a tachometer, a target steering angle sensor, and an actual steering angle sensor. The tachometer senses the speed of the engine of the work vehicle. The target steering angle sensor senses the target steering angle inputted with the operation member. The actual steering angle sensor senses the actual steering angle changed by the hydraulic actuator. The values relating to the discharge flow rate of the hydraulic pump are the target steering angle and the actual steering angle. The controller has a calculator. The calculator calculates a deviation angle from the value sensed by the target steering angle sensor and the value sensed by the actual steering angle sensor. The threshold value is the threshold value of the deviation angle preset on the basis of the deviation angle at which the discharge flow rate of the hydraulic pump reaches its maximum discharge flow rate with respect to the engine speed. The controller causes the notification component to perform the notification when the deviation angle reaches the threshold value at the sensed engine speed.

Consequently, by acquiring the deviation angle and the engine speed, it can be determined to reach the predetermined threshold value on the basis of the maximum discharge flow rate of the hydraulic pump, so the operator can be notified that the steering angular velocity has approached or reached its upper limit.

Setting the threshold value of the deviation angle to a value just short of when the corresponding value reaches the upper limit of the steering angular velocity allows the operator to recognize that the steering angular velocity will reach the upper limit in a steering operation. Also, setting the threshold value of the deviation angle to a value at or just beyond the upper limit of the steering angular velocity allows the operator to recognize that the steering angular velocity has reached its upper limit in a steering operation.

The work vehicle according to a seventh aspect is the work vehicle according to the first aspect, wherein the operating member is a joystick lever. The notification component is disposed on the joystick lever, and has a vibrator, and a motor for vibrating the vibrator.

This allows the operator to recognize information related to the upper limit of the steering angular velocity from vibrations.

The work vehicle according to an eighth aspect is the work vehicle according to the first aspect, wherein the notification component notifies the operator with light or sound.

The notification component has, for example, a light, a sounder, or the like, and the operator can recognize from light or sound that the steering angular velocity has reached the upper limit. Light and sound may also be used in combination. Also, if there is a display screen, a display may be used for the light.

The work vehicle according to a ninth aspect is the work vehicle according to the first aspect, wherein the notification component has a force imparting component that imparts an assisting force or a counterforce to the operation of the operating member. The notification component notifies the operator with an imparted force.

For example, when the steering angular velocity reaches the upper limit, resistance to the operation of the operating member can be produced so that the operator recognizes information related to the upper limit of the steering angular velocity.

The work vehicle according to a tenth aspect is the work vehicle according to any of the first to ninth aspects, wherein the control valve is mechanically linked to the operating member.

As a result, the operator can directly feel the operation of the control valve.

The method for controlling a work vehicle according to an eleventh aspect comprises an angular velocity corresponding value acquisition step, a determination step, and a notification step. The angular velocity corresponding value acquisition step involves acquiring a corresponding value that corresponds to the steering angular velocity when the steering angle is changed by operating the operating member. The determination step involves determining that the corresponding value has reached a threshold value that is preset on the basis of the upper limit of the steering angular velocity. The notification step involves notifying that the corresponding value has reached the threshold value.

Consequently, setting the threshold value to a value just before reaching the upper limit of the steering angular velocity, for example, allows the operator to recognize that the steering angular velocity is approaching the upper limit during a steering operation. Also, setting the threshold value to a value at or beyond the upper limit of the steering angular velocity allows the operator to recognize that the steering angular velocity has been reached during a steering operation.

Thus, the operator can recognize information related to the upper limit of the steering angular velocity, such as that the steering angular velocity has approached the upper limit or that the steering angular velocity has reached the upper limit during a steering operation. Therefore, the operator will not push the operation member beyond this position, and unnecessary operation can be suppressed. Also, since unnecessary operation can be suppressed in this manner, the operator does not use his hand muscles more than necessary, which reduces the toll on his body.

The present invention provides a work vehicle and work vehicle control method with which an operator can be notified of information related to the upper limit of the steering angular velocity.

DETAILED DESCRIPTION OF EMBODIMENTS

The wheel loader in an embodiment of the present invention will now be described through reference to the drawings.

Embodiment 1

1. Configuration 1-1. Overview of Wheel Loader Configuration

Figure 1:
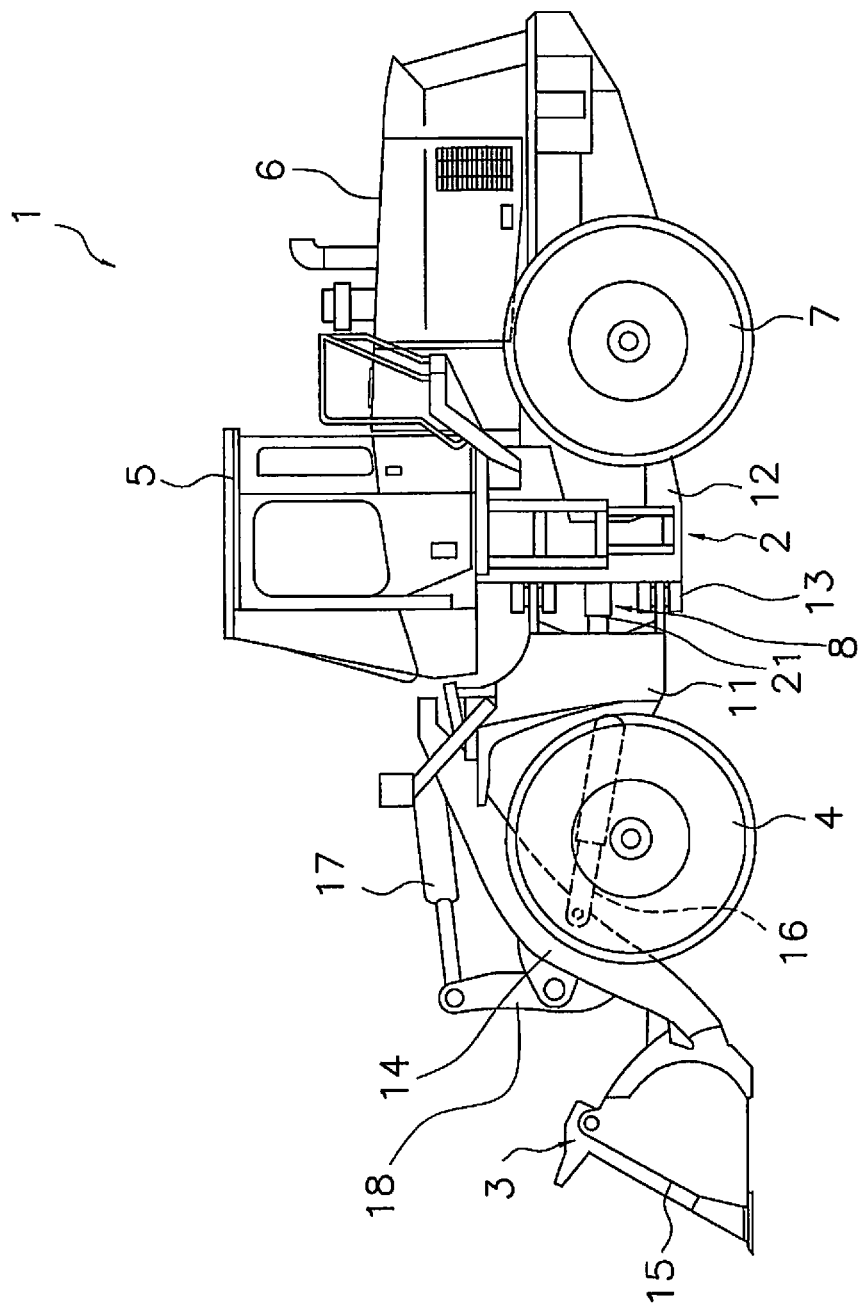
FIG. 1 is a side view of a wheel loader in Embodiment 1 of the present invention.

FIG. 1 is a simplified diagram of the configuration of a wheel loader 1 in this embodiment. The wheel loader 1 in this embodiment comprises a body frame 2, a work implement 3, a pair of front tires 4, a cab 5, an engine compartment 6, a pair of rear tires 7, and a steering operation device 8 (see FIG. 2 (discussed below)).

The wheel loader 1 uses the work implement 3 to load earth and perform other such work.

The body frame 2 is what is called an articulated type, and has a front frame 11, a rear frame 12, and a connecting shaft 13. The front frame 11 is disposed ahead of the rear frame 12. The connecting shaft 13 is provided in the center in the vehicle width direction, and links the front frame 11 and the rear frame 12 so that they can pivot relative to each other. The front tires 4 are mounted on the left and right sides of the front frame 11. The rear tires 7 are mounted on the left and right sides of the rear frame 12.

The work implement 3 is driven by working fluid from a work implement pump (not shown). The work implement 3 has a boom 14, a bucket 15, a lift cylinder 16, and a bucket cylinder 17. The boom 14 is mounted on the front frame 11. The bucket 15 is attached to the distal end of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. Expansion and contraction of the lift cylinder 16 causes the boom 14 to pivot up and down. One end of the bucket cylinder 17 is attached to the front frame 11, and the other end of the bucket cylinder 17 is attached to the bucket 15 via a bell crank 18. As the bucket cylinder 17 expands and contracts, the bucket 15 pivots up and down.

The cab 5 is installed on the rear frame 12, and in its interior are disposed a steering wheel or a joystick lever 24 (see FIG. 2 (discussed below)) for a steering operation, a lever for operating the work implement 3, various display devices, and the like. The engine compartment 6 is disposed on the rear frame 12 to the rear of the cab 5, and houses an engine.

The steering operation device 8 will be described in detail below, but has steering cylinders 21 and 22, and when the flow of fluid supplied to the steering cylinders 21 and 22 is changed, this changes the steering angle of the front frame 11 with respect to the rear frame 12, thereby changing the traveling direction of the wheel loader 1.

1-2. Steering Device

Figure 2:
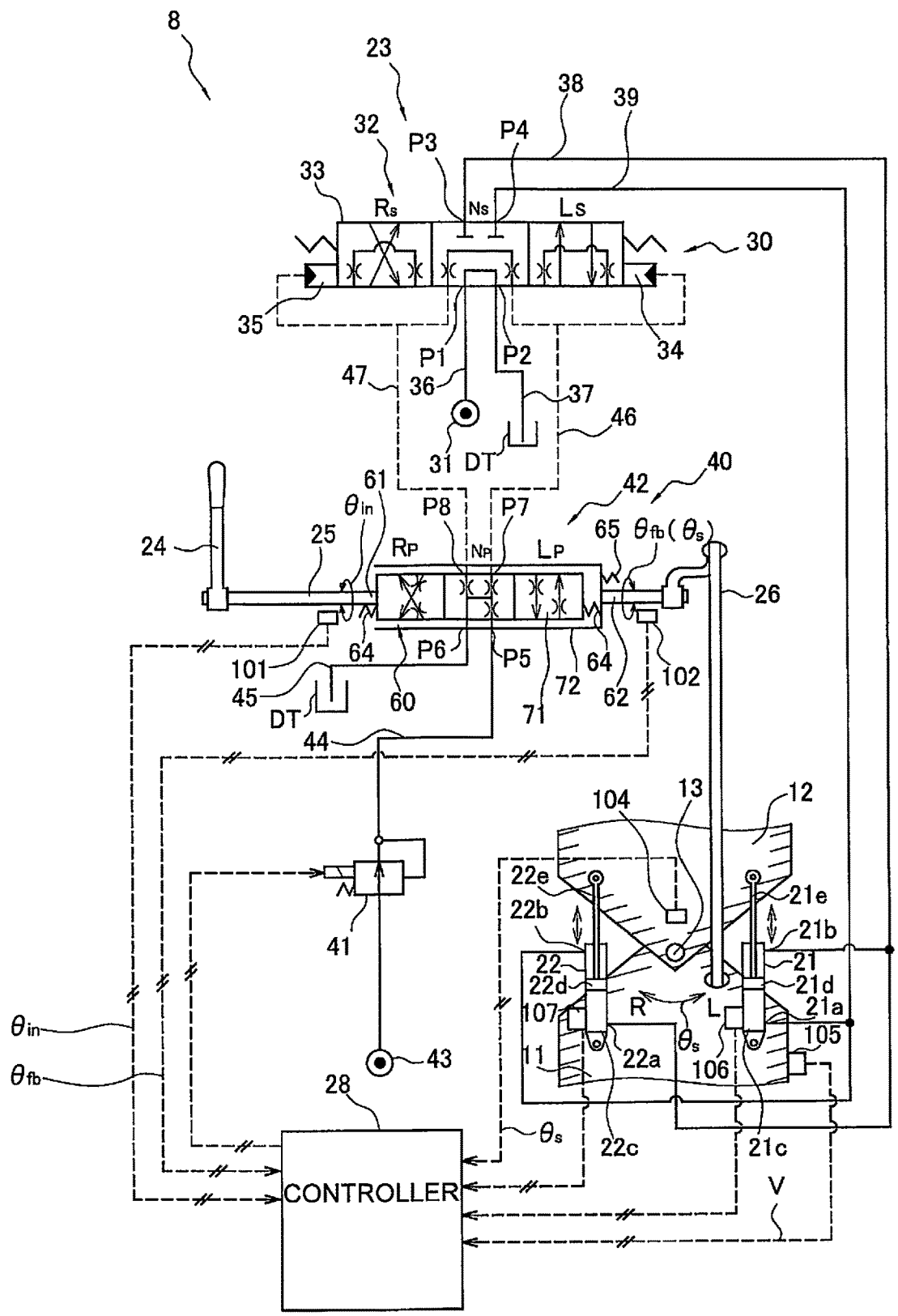
FIG. 2 is a hydraulic circuit diagram showing the configuration of the steering operation device of the wheel loader in FIG. 1.

FIG. 2 is a hydraulic circuit diagram of the configuration of the steering operation device 8. The steering operation device 8 in this embodiment mainly has the pair of steering cylinders 21 and 22, a steering hydraulic circuit 23, the joystick lever 24, a connecting portion 25, a link mechanism 26, an angular velocity corresponding value sensing unit 27, a controller 28, and a notification component 29.

1-2-1. Steering Cylinders

The steering cylinders 21 and 22 are driven by hydraulic pressure. The steering cylinders 21 and 22 are disposed side by side on the left and right sides in the vehicle width direction, with the connecting shaft 13 in between. The steering cylinder 21 is disposed on the left side of the connecting shaft 13 (see FIG. 1). The steering cylinder 22 is disposed on the right side of the connecting shaft 13.

The steering cylinder 21 has a cylinder tube 21c, a piston 21d, and a piston rod 21e. The cylinder tube 21c is linked to the front frame 11. The piston 21d is provided slidably in the cylinder tube 21c. The piston rod 21e is fixed to the piston 21d and is linked to the rear frame 12.

The steering cylinder 22 has a cylinder tube 22c, a piston 22d, and a piston rod 22e. The cylinder tube 22c is linked to the front frame 11. The piston 22d is provided slidably in the cylinder tube 22c. The piston rod 22e is fixed to the piston 22d and is linked to the rear frame 12.

The steering cylinder 21 is provided with an extension port 21a and a contraction port 21b, and the steering cylinder 22 is provided with an extension port 22a and a contraction port 22b.

In the steering cylinder 21, the piston 21d divides the space inside the cylinder tube 21c into a first space on the piston rod 21e side and a second space on the opposite side. The extension port 21a is connected to the second space, and the contraction port 21b is connected to the first space.

In the steering cylinder 22, the piston 22d divides the space inside the cylinder tube 22c into a first space on the piston rod 22e side and a second space on the opposite side. The extension port 22a is connected to the second space, and the contraction port 22b is connected to the first space.

When fluid is supplied to the extension port 21a of the steering cylinder 21 and the contraction port 22b of the steering cylinder 22, and fluid is discharged from the contraction port 21b of the steering cylinder 21 and the extension port 22a of the steering cylinder 22, the steering cylinder 21 extends and the steering cylinder 22 contracts. This changes the steering angle θs, and the vehicle turns to the right. When fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22, the steering cylinder 21 contracts and the steering cylinder 22 extends. This changes the steering angle θs, and the vehicle turns to the left.

A steering angle sensor 104 that senses the steering angle θs is provided near the connecting shaft 13 disposed between the steering cylinders 21 and 22. The steering angle sensor 104 is constituted by a potentiometer, for example, and the sensed steering angle θs is sent to the controller 28 as a sensing signal.

The steering cylinder 21 is provided with a cylinder stroke sensor 106 for sensing the stroke of the cylinder, and the steering cylinder 22 is provided with a cylinder stroke sensor 107 for sensing the stroke of that cylinder. The values sensed by these cylinder stroke sensors 106 and 107 may be sent to the controller 28 to find the steering angle θs.

1-2-2. Steering Hydraulic Circuit

The steering hydraulic circuit 23 is a hydraulic circuit for adjusting the flow of fluid supplied to the steering cylinders 21 and 22. The steering hydraulic circuit 23 has a main hydraulic circuit 30 and a pilot hydraulic circuit 40.

(a) Main Hydraulic Circuit

The main hydraulic circuit 30 is a circuit that supplies fluid from a steering pump 31a to the steering cylinders 21 and 22, and has a steering valve 32. The main hydraulic pressure source 31 is made up of the steering pump 31a (FIG. 8 (discussed below)) which is a hydraulic pump, a relief valve, and the like.

The steering valve 32 is a spool type of valve, and is a flow control valve that adjusts the flow of fluid supplied to the steering cylinders 21 and 22 according to the inputted pilot pressure. The steering valve 32 has a main pump port P1, a main drain port P2, a first steering port P3, and a second steering port P4. The main pump port P1 is connected to the main hydraulic pressure source 31 via a main hydraulic line 36. The main drain port P2 is connected to a drain tank DT that collects fluid via a main drain line 37. The first steering port P3 is connected to the contraction port 21b of the steering cylinder 21 and the extension port 22a of the steering cylinder 22 via a first steering line 38. The second steering port P4 is connected to the extension port 21a of the steering cylinder 21 and the contraction port 22b of the steering cylinder 22 via a second steering line 39.

The steering valve 32 has a valve body 33 that can move between a neutral position Ns, a left steering position Ls, and a right steering position Rs. When the valve body 33 is in the neutral position Ns, the main pump port P1 and the main drain port P2 are communicating with each other. In this case, the first steering port P3 and the second steering port P4 are not communicating with any port. When the valve body 33 is in the left steering position Ls, the main pump port P1 and the first steering port P3 are communicating with each other, and the main drain port P2 and the second steering port P4 are communicating with each other. When the valve body 33 is in the right steering position Rs, the main pump port P1 and the second steering port P4 are communicating with each other, and the main drain port P2 and the first steering port P3 are communicating with each other.

The steering valve 32 has a first pilot chamber 34 and a second pilot chamber 35. When no pilot pressure is being supplied to the first pilot chamber 34 or the second pilot chamber 35, and in a state in which the same pilot pressure is being supplied to the first pilot chamber 34 and the second pilot chamber 35, the valve body 33 is in the neutral position Ns. In a state in which the pilot pressure is being supplied only to the first pilot chamber 34, the valve body 33 is in the left steering position Ls. In a state in which the pilot pressure is supplied only to the second pilot chamber 35, the valve body 33 is in the right steering position Rs. When the valve body 33 is in the left steering position Ls and the right steering position Rs, the steering valve 32 changes the opening surface area through which the fluid from the main hydraulic pressure source 31 passes, according to the supplied pilot pressure. Consequently, the steering valve 32 controls the flow of fluid supplied to the steering cylinder 21 or the steering cylinder 22 according to the pilot pressure.

(b) Pilot Hydraulic Circuit

The pilot hydraulic circuit 40 is a circuit for supplying fluid from a pilot hydraulic pressure source 43 to the first pilot chamber 34 and the second pilot chamber 35 of the steering valve 32.

The pilot hydraulic circuit 40 has a variable pressure reducer 41 and a pilot valve 42.

(i) Variable Pressure Reducer

The variable pressure reducer 41 reduces and adjusts the hydraulic pressure sent from the pilot hydraulic pressure source 43 to the pilot valve 42. The variable pressure reducer 41 has a built-in electromagnetic pressure reducing valve, and receives a command signal from the controller 28 to control the hydraulic pressure.

(ii) Pilot Valve

The pilot valve 42 is a rotary valve that adjusts the pilot pressure inputted from the pilot hydraulic pressure source 43 to the steering valve 32.

Overview of Pilot Valve Configuration

The rotary pilot valve 42 has a pilot pump port P5, a pilot drain port P6, a first pilot port P7, and a second pilot port P8. The pilot pump port P5 is connected to the variable pressure reducer 41 via the pilot hydraulic line 44, and the variable pressure reducer 41 is connected to the pilot hydraulic pressure source 43. The pilot drain port P6 is connected to the drain tank DT that collects fluid via a pilot drain line 45. The first pilot port P7 is connected to the first pilot chamber 34 of the steering valve 32 via the first pilot line 46. The second pilot port P8 is connected to the second pilot chamber 35 of the steering valve 32 via the second pilot line 47.

The pilot valve 42 has a valve body component 60 including an operation spool 71 and an operation sleeve 72. With the operation sleeve 72 as a reference, the operation spool 71 is able to move between the neutral position Np, the left pilot position Lp, and the right pilot position Rp.

When the operation spool 71 is in the neutral position Np with respect to the operation sleeve 72, the pilot pump port P5, the pilot drain port P6, the first pilot port P7, and the second pilot port P8 communicate with each other. When the operation spool 71 is in the left pilot position Lp with respect to the operation sleeve 72, the pilot pump port P5 communicates with the first pilot port P7, and the pilot drain port P6 communicates with the second pilot port P8. When the operation spool 71 is in the right pilot position Rp with respect to the operation sleeve 72, the pilot pump port P5 communicates with the second pilot port P8, and the pilot drain port P6 communicates with the first pilot port P7.

Figure 3:
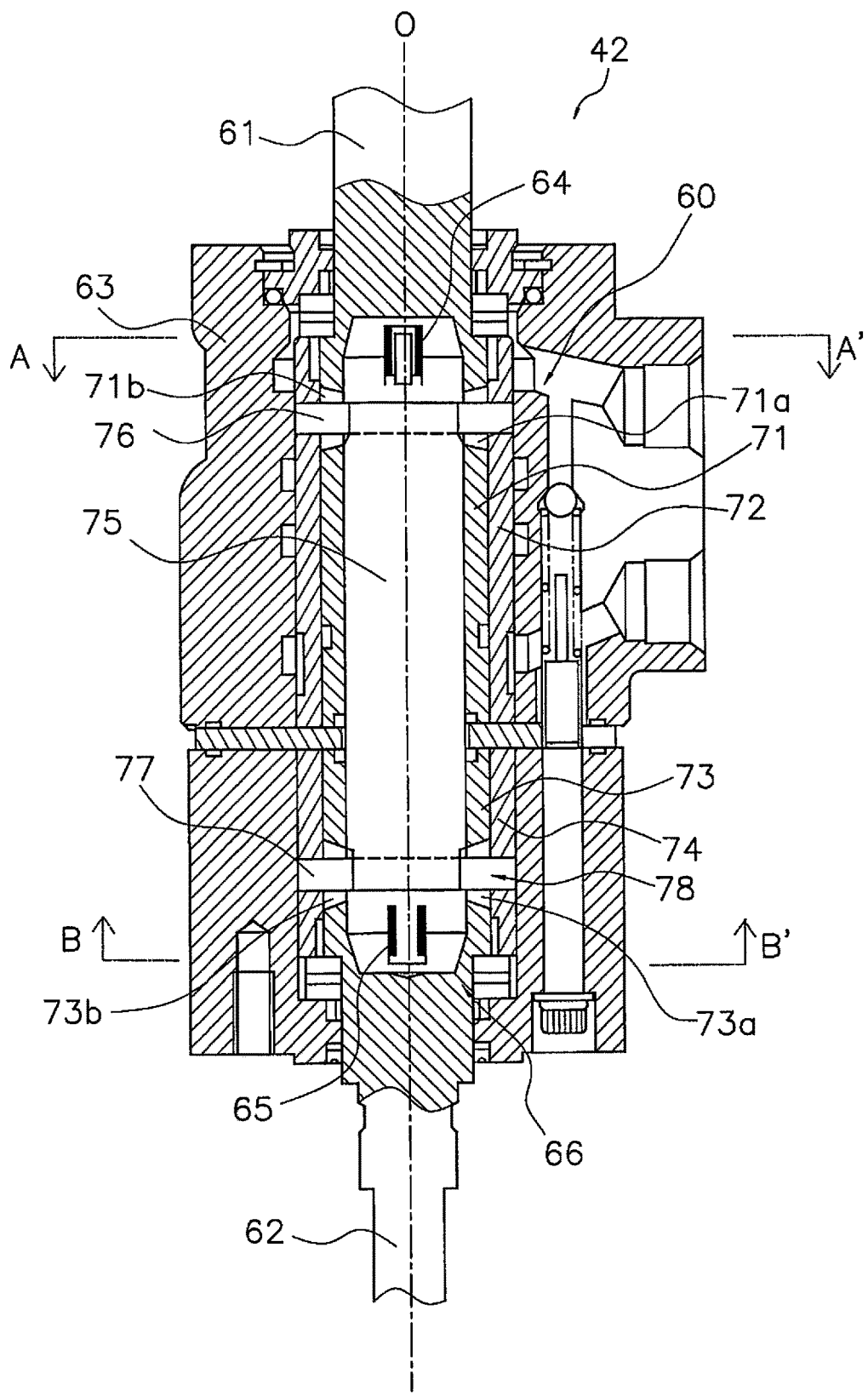
FIG. 3 is a cross sectional configuration diagram showing the pilot valve in FIG. 2.

FIG. 3 is a cross sectional configuration diagram of the pilot valve 42.

The pilot valve 42 mainly has the valve body component 60, an operation input shaft 61, a feedback input shaft 62, a housing 63, a first spring 64, a second spring 65, and a feedback component 66.

Operation Input Shaft

The operation input shaft 61 is provided rotatably around its center axis O, and is inserted into the housing 63. The operation input shaft 61 is connected to the joystick lever 24 (discussed below) via the connecting portion 25. The operation input shaft 61 rotates at the same rotation angle as the rotation angle θin of the joystick lever 24 to the left and right.

Feedback Input Shaft

The feedback input shaft 62 is disposed coaxially with the operation input shaft 61, and is provided rotatably around the center axis O. The feedback input shaft 62 is inserted into the housing 63 so as to be opposite the operation input shaft 61. The feedback input shaft 62 is linked to the front frame 11 via the link mechanism 26 (discussed below), and rotates at the same rotation angle as the steering angle θs of the front frame 11 with respect to the rear frame 12.

Housing

A substantially cylindrical space is formed in the housing 63, and the operation input shaft 61 and the feedback input shaft 62 are inserted as described above. The housing 63 houses the valve body component 60 and the feedback component 66, and the pilot pump port P5, the pilot drain port P6, the first pilot port P7, and the second pilot port P8 are formed in the housing 63.

Valve Body Component

The valve body component 60 has the operation spool 71 and the operation sleeve 72, and moves between the neutral position Np, the left pilot position Lp, and the right pilot position Rp when the operation spool 71 rotates with respect to the operation sleeve 72.

The operation spool 71 is substantially cylindrical in shape and is disposed coaxially with the operation input shaft 61, and is connected to the operation input shaft 61. The joystick lever 24 is connected to the operation input shaft 61 via the connecting portion 25 (discussed below), and when the operator operates the joystick lever 24 to the right side by the rotation angle θin, the operation input shaft 61 and the operation spool 71 also rotate to the right around the center axis O by the rotation angle θin. Slits 71a and 71b are formed in the operation spool 71 near the operation input shaft 61, along the circumferential direction at two opposing positions so as to sandwich the center axis O in between.

The operation sleeve 72 has a substantially cylindrical shape and is disposed outside the operation spool 71 and inside the housing 63 so as to be rotatable with respect to the operation spool 71 and the housing 63.

In this specification, "right rotation" and "left rotation" refer to the rotation direction when viewed from above.

First Spring

The first spring 64 is inserted between the operation spool 71 and the operation sleeve 72, which are rotatable with respect to each other, and generates a counterforce corresponding to the difference in rotation angle between the operation spool 71 and the operation sleeve 72.

Figure 4:
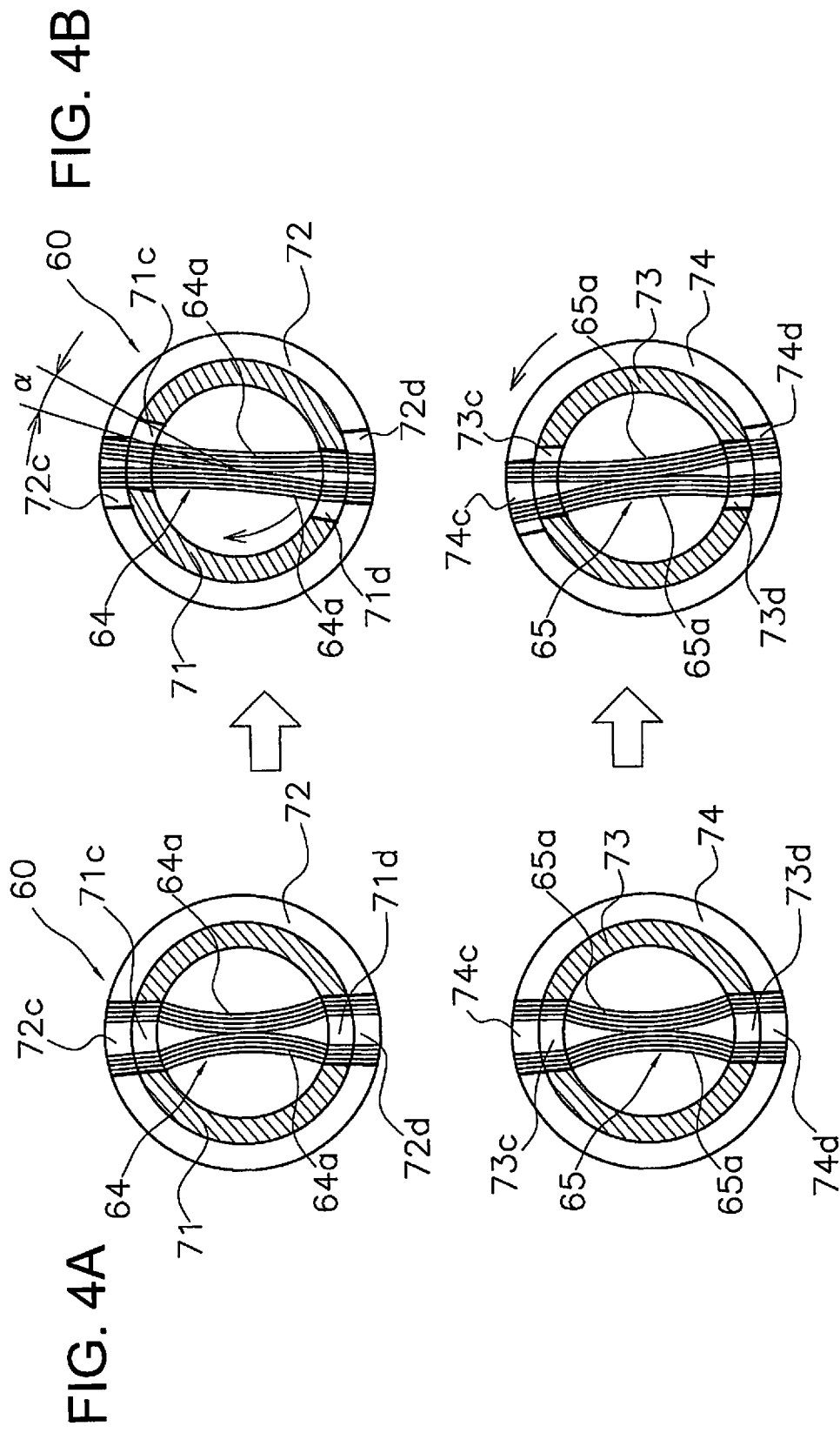
FIGS. 4A and 4B are cross sections along the A-A' line in FIG. 3, and FIGS. 4C and 4D are cross sections along the B-B' line in FIG. 3.

FIG. 4A is a cross section along the A-A' line perpendicular to the center axis O. As shown in FIG. 4A, square holes 71c and 71d are provided to diametrically opposed walls of the operation spool 71. Also, rectangular grooves 72c and 72d are formed in diametrically opposed walls at the end of the operation sleeve 72 on the operation input shaft 61 side. The first spring 64 is formed from two sets of leaf springs 64a in which a plurality of convex leaf springs are stacked. The two sets of leaf springs 64a are arranged so that the convex parts are opposite each other to form an X shape in FIG. 4A. The two sets of leaf springs 64a pass through the holes 71c and 71d in the operation spool 71, and the ends thereof intrude the grooves 72c and 72d in the operation sleeve 72. Thus, the operation spool 71 and the operation sleeve 72 are linked by the first spring 64.

As shown in FIG. 4A, a state in which the circumferential positions of the hole 71c and the groove 72c substantially coincide and the circumferential positions of the hole 71d and the groove 72d substantially coincide is a state in which the valve body component 60 is in the neutral position Np.

Also, when the joystick lever 24 is operated, the operation spool 71 rotates with respect to the operation sleeve 72 as shown in FIG. 4B, and the operation spool 71 moves to the left pilot position Lp or the right pilot position Rp with respect to the operation sleeve 72. When the joystick lever 24 is rotated to the right, the operation spool 71 rotates to the right with respect to the operation sleeve 72 and moves to the right pilot position Rp. When the joystick lever 24 is rotated to the left, the operation spool 71 rotates to the left with respect to the operation sleeve 72 and moves to the left pilot position Lp.

In this movement, since the operator moves the joystick lever 24 against the spring force of the first spring 64, a lever counterforce is generated at the joystick lever 24. In other words, the first spring 64 biases the operation spool 71 so as to be in the neutral position Np with respect to the operation sleeve 72.

Feedback Component

Meanwhile, the feedback component 66 feeds back the steering angle θs of the front frame 11 with respect to the rear frame 12 to the valve body component 60. The feedback component 66 mainly has a feedback spool 73, a feedback sleeve 74, a drive shaft 75, a first center pin 76, and a restrictor 78.

The drive shaft 75 is disposed between the operation input shaft 61 and the feedback input shaft 62, and coaxially (the center axis O) with the operation input shaft 61 and the feedback input shaft 62. The drive shaft 75 is disposed inside the operation spool 71. The first center pin 76 is disposed perpendicular to the center axis O at the end of the drive shaft 75 on the operation input shaft 61 side. The ends of the first center pin 76 pass through the slits 71a and 71b and are fixed to the operation sleeve 72. As will be described in detail below, the rotation angle of the operation spool 71 with respect to the operation sleeve 72 is restricted to an angle within a specific range by the first center pin 76 and the slits 71a and 71b. Also, since the first center pin 76 is fixed to the operation sleeve 72 and the drive shaft 75, when the drive shaft 75 rotates, the operation sleeve 72 integrated with the drive shaft 75 also rotates.

The feedback spool 73 has a substantially cylindrical shape and is disposed coaxially with the feedback input shaft 62, and is connected to the feedback input shaft 62. Slits 73a and 73b are formed in the feedback spool 73 in the circumferential direction near the feedback input shaft 62, at two positions opposite each other with the center axis O in between. The drive shaft 75 is disposed inside the feedback spool 73. The feedback input shaft 62 is linked to the front frame 11 via the link mechanism 26 (discussed below), and when the front frame 11 rotates to the right by the steering angle θs with respect to the rear frame 12, the feedback input shaft 62 and the feedback spool 73 also rotate to the right by the same rotation angle θs as the steering angle θs.

The feedback sleeve 74 has a substantially cylindrical shape and is disposed outside the feedback spool 73 and inside the housing 63 so as to be rotatable with respect to the feedback spool 73 and the housing 63.

The restrictor 78 restricts the rotation of the feedback sleeve 74 with respect to the feedback spool 73 to an angle within a specific range. The restrictor 78 is constituted by a second center pin 77 and wall portions 73ae and 73be (see FIG. 7 (discussed below)) at the ends of the slits 73a and 73b in the circumferential direction.

The second center pin 77 is disposed at the end of the drive shaft 75 on the feedback input shaft 62 side, perpendicular to the center axis O. The ends of the second center pin 77 pass through the slits 73a and 73b and are fixed to the feedback sleeve 74. The rotation of the feedback sleeve 74 relative to the feedback spool 73 is restricted to an angle within a specific range by the second center pin 77 and the slits 73a and 73b. Also, since the second center pin 77 is fixed to the feedback sleeve 74 and the drive shaft 75, when the feedback sleeve 74 rotates, the drive shaft 75 integrated with the feedback sleeve 74 also rotates. When the drive shaft 75 rotates, the operation sleeve 72 fixed to the drive shaft 75 is rotated by the first center pin 76.

Second Spring

The second spring 65 is inserted between the feedback spool 73 and the feedback sleeve 74, which are rotatable with respect to each other, and generates a counterforce corresponding to the rotation difference between the spool and the sleeve. FIG. 4C is a cross section along the B-B' line in FIG. 23.

As shown in FIG. 4C, square holes 73c and 73d are provided to diametrically opposed walls of the feedback spool 73.

Rectangular grooves 74c and 74d are formed in diametrically opposed walls at the end of the feedback sleeve 74 on the feedback input shaft 62 side. The second spring 65 is formed from two sets of leaf springs 65a in which a plurality of convex leaf springs are stacked. The two sets of leaf springs 65a are disposed so that the convex parts are opposite each other to form an X shape in FIG. 4C. The two sets of leaf springs 65a pass through the holes 73c and 73d in the feedback spool 73 and the ends thereof intrude the grooves 74c and 74d in the operation sleeve 72. The feedback spool 73 and the feedback sleeve 74 are thus linked by the second spring 65. In the state in FIG. 4C, the hole 73c and the groove 74c coincide in the circumferential direction, and the hole 73d and the groove 74d coincide in the circumferential direction. The feedback sleeve 74 is thus biased by the second spring 65 so that the positions of the grooves 74c and 74d in the circumferential direction coincide with the circumferential positions of the holes 73c and 73d in the feedback spool 73.

Although the first spring 64 bends until the operation spool 71 is restricted with respect to the operation sleeve 72, the second spring 65 is set to begin bending upon being subjected to a force greater than or equal to the counterforce generated in the first spring 64 until the first spring 64 is restricted.

Figure 7:
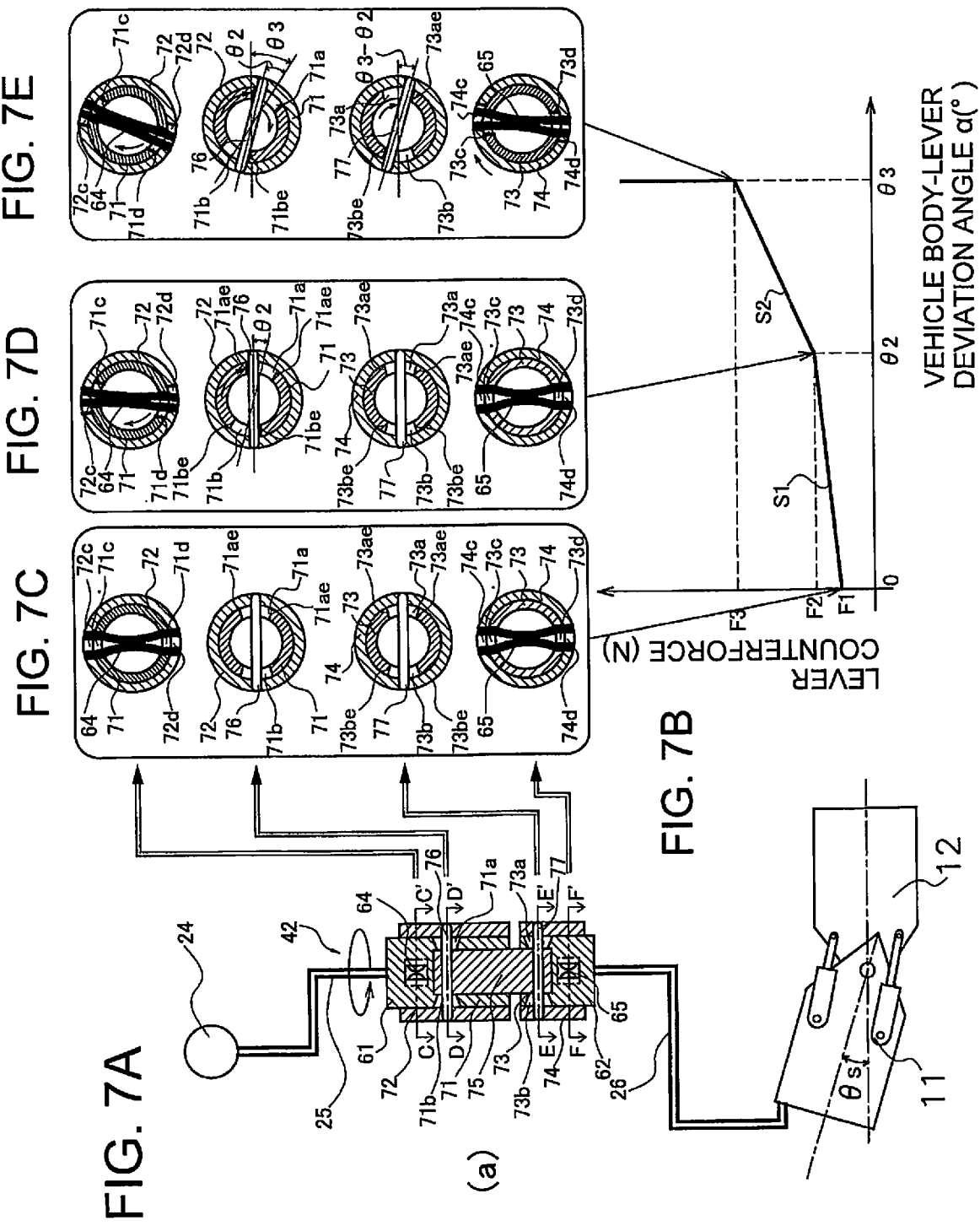
FIG. 7A is a simplified diagram of the pilot valve in FIG. 3.
FIG. 7B is a graph of the relation between the vehicle body-lever deviation angle and the lever counterforce in the pilot valve in FIG. 7A, FIG. 7C consists of cross sections along the C-C', D-D', E-E', and F-F' lines in FIG. 7A when the deviation angle α is zero, FIG. 7D consists of cross sections along the C-C', D-D', E-E', and F-F' lines in FIG. 7A when the deviation angle α is θ2, and FIG. 7E consists of cross sections along the C-C', D-D', E-E', and F-F' lines in FIG. 7A when the deviation angle α is θ3.

More precisely, as will be discussed below through reference to FIG. 7, when the operation spool 71 rotates to the angle at which the operation spool 71 is restricted with respect to the operation sleeve 72, and when the joystick lever 24 is then operated, as shown in FIG. 4D, the second spring 65 bends and the feedback sleeve 74 rotates with respect to the feedback spool 73. FIG. 4D is a cross section along the B-B' line in FIG. 3, and since the view is from below, the arrows in the rotation direction are opposite to those in FIG. 4B.

That is, when the joystick lever 24 is operated beyond the angle at which the operation spool 71 is restricted with respect to the operation sleeve 72, the operator has to operate the joystick lever 24 against the biasing force of the second spring 65.

With the above configuration of the feedback component 66, when the feedback input shaft 62 rotates in response to a change in the steering angle, the feedback spool 73 rotates, and the feedback sleeve 74 linked to the feedback spool 73 via the second spring 65 also rotates. Then, the operation sleeve 72 fixed to the feedback sleeve 74 via the second center pin 77, the drive shaft 75, and the first center pin 76 rotates, a change occurs in the difference in the rotation angle between the operation spool 71 and the operation sleeve 72, and the pilot pressure is changed.

That is, with the pilot valve 42, the position of the operation spool 71 with respect to the operation sleeve 72 moves to the neutral position Np, the left pilot position Lp, or the right pilot position Rp according to the difference a between the rotation angle θin of the operation input shaft 61 and the rotation angle ft) of the feedback input shaft 62 (which coincides with the steering angle θs). When the rotation angle difference a is zero, the operation spool 71 is in the neutral position Np with respect to the operation sleeve 72. When the operation spool 71 is in the left pilot position Lp or the right pilot position Rp with respect to the operation sleeve 72, the pilot valve 42 changes the opening surface area through which fluid passes from the pilot hydraulic pressure source 43 in accordance with the rotation angle difference a. This adjusts the pilot pressure that is sent from the pilot valve 42 to the steering valve 32 according to the difference a of the rotation angle.

The operation input shaft 61 is provided with a first rotation angle sensor 101 constituted by a rotary sensor, for example. The first rotation angle sensor 101 senses the rotation angle θin of the operation input shaft 61. The feedback input shaft 62 is provided with a second rotation angle sensor 102 constituted by a rotary sensor, for example. The second rotation angle sensor 102 senses the rotation angle θft) (=θs) of the feedback input shaft 62. The rotation angles θin and θfb sensed by the first rotation angle sensor 101 and the second rotation angle sensor 102 are sent to the controller 28 as sensing signals.

As described above, the steering angle θs is also sensed by the steering angle sensor 104 in the connecting shaft 13, but since the rotation angle θfb of the feedback input shaft 62 coincides with the steering angle θs, the steering angle sensor 104 need not be provided.

1-2-3. Joystick Lever, Connecting Portion

Figure 5:
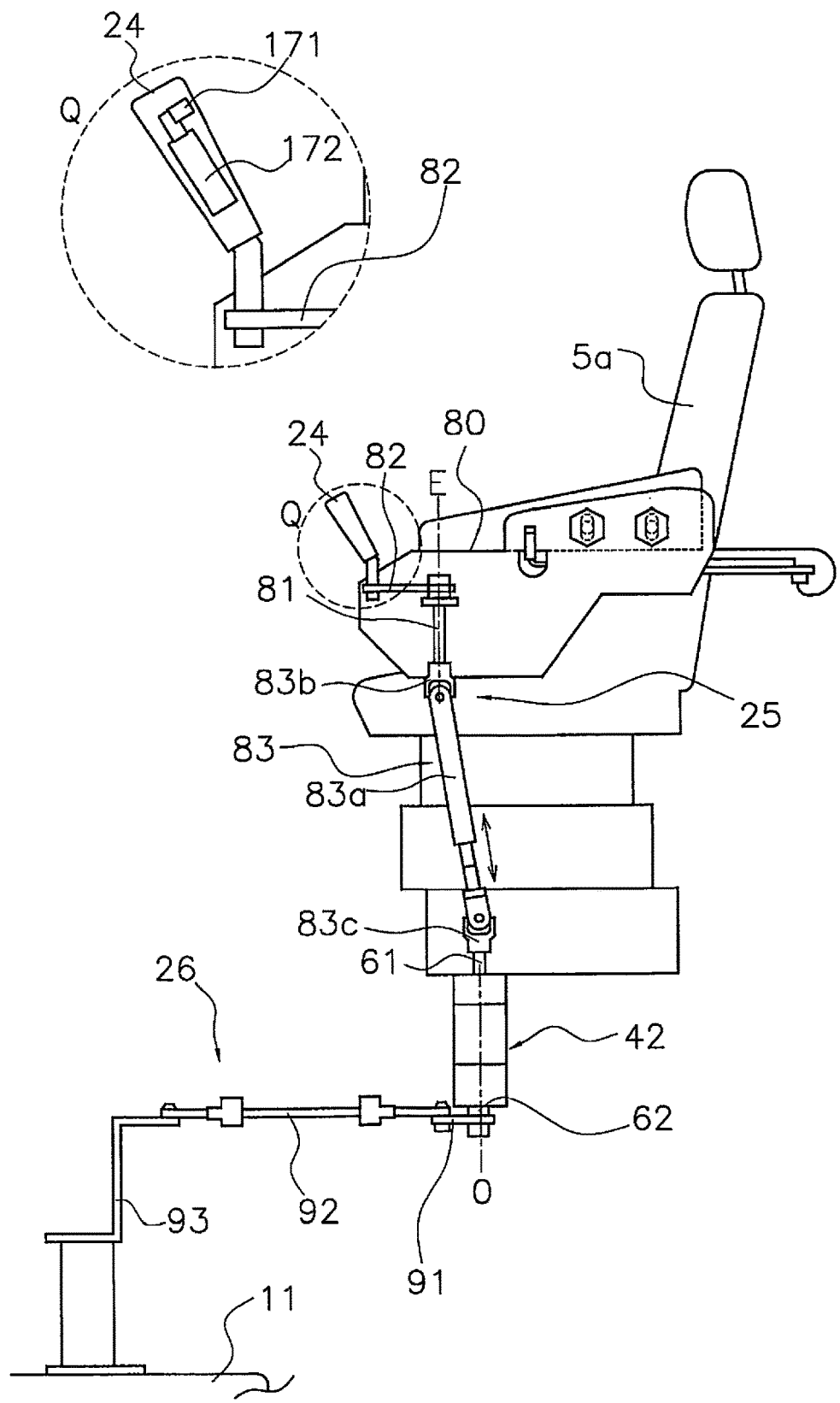
FIG. 5 is a side view of the connecting portion and the link mechanism in FIG. 2.

FIG. 5 is a side view of the configuration inside the cab 5. A driver's seat 5a on which the operator sits is provided in the cab 5. A steering box 80 is disposed on the left side of the driver's seat 5a in the vehicle width direction.

The joystick lever 24 is disposed so as to protrude obliquely upward from the steering box 80 toward the front.

The connecting portion 25 connects the joystick lever 24 and the pilot valve 42. The connecting portion 25 mainly has a steering operation shaft 81, a connecting bar 82, and a universal joint 83.

The steering operation shaft 81 is disposed vertically and is supported by the steering box 80 so as to be rotatable around its center axis E. The connecting bar 82 is disposed in the steering box 80 and connects the joystick lever 24 and the steering operation shaft 81.

The universal joint 83 connects the steering operation shaft 81 to the operation input shaft 61 of the pilot valve 42 disposed near the driver's seat 5a. The universal joint 83 has a telescoping central portion 83a and joint portions 83b and 83c disposed at the ends of the central portion 83a. The joint portion 83b is connected to the steering operation shaft 81. The joint portion 83c is connected to the operation input shaft 61.

Figure 6:
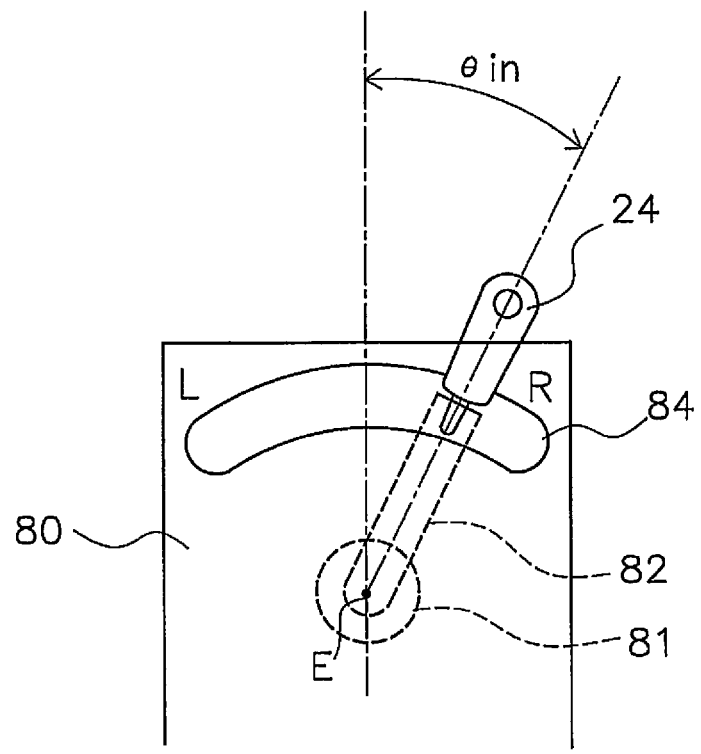
FIG. 6 is a top view of the joystick lever in FIG. 5.

FIG. 6 is a plan view of the area near the joystick lever 24 as viewed from above. As shown in FIG. 6, the joystick lever 24 is formed so as to protrude obliquely upward from an arc-shaped hole 84 formed in the upper face of the steering box 80. The joystick lever 24 can be turned horizontally around the steering operation shaft 81 (more precisely, the center axis E). Also, an R mark is formed at the edge on the right end of the hole 84 in the steering box 80, and an L mark is formed at the edge on the left end.

For example, as shown in FIG. 6, when the operator rotates the joystick lever 24 from the center position to the right side by the rotation angle θin, the steering operation shaft 81 also rotates to the right by the angle θin. This rotation of the steering operation shaft 81 by the rotation angle θin is transmitted through the universal joint 83 to the operation input shaft 61, and the operation input shaft 61 also rotates to the right by the rotation angle θin. The same applies when the joystick lever 24 is rotated to the left.

1-2-4. Link Mechanism

The link mechanism 26 has a follow-up lever 91, a follow-up link 92, and a bracket 93. The follow-up lever 91 is fixed to the feedback input shaft 62.

The follow-up link 92 is fixed to the follow-up lever 91 fixed to the feedback input shaft 62 of the pilot valve 42. The bracket 93 is fixed to the front frame 11. The follow-up link 92 links the follow-up lever 91 and the bracket 93.

The front frame 11 is linked by the link mechanism 26 to the pilot valve 42 disposed on the rear frame 12.

The link mechanism 26 makes the steering angle θs of the front frame 11 relative to the rear frame 12 be the same as the rotation angle θfb of the feedback input shaft 62.

That is, when the front frame 11 rotates to the right side by the steering angle θs around the connecting shaft 13 with respect to the rear frame 12, the feedback input shaft 62 also rotates to the right by the rotation angle θs via the link mechanism 26, and when the front frame 11 rotates to the left side by the steering angle θs, the feedback input shaft 62 also rotates to the left by the rotation angle θs via the link mechanism 26.

1-2-5. Lever Counterforce

The lever counterforce generated by the first spring 64 and the second spring 65 when operating the joystick lever 24 will now be described.

FIG. 7A is a simplified diagram of the pilot valve 42. FIG. 7B is a graph of the relation between the vehicle body-lever deviation angle and the lever counterforce. The vehicle body-lever deviation angle α is the difference (θin −θfb) between the rotation angle θin of the joystick lever 24 and the steering angle θs (=θfb) of the front frame 11 with respect to the rear frame 12. FIG. 7C consists of cross sections along the C-C', D-D', E-E', and F-F' lines in FIG. 7A when the deviation angle α is zero. FIG. 7D consists of cross sections along the C-C', D-D', E-E', and F-F' lines in FIG. 7A when the deviation angle α is θ2. FIG. 7E consists of cross sections along the C-C', D-D', E-E', and F-F' lines in FIG. 7A when the when the deviation angle α is θ3. As shown in FIG. 7A, the cross sections along the C-C', D-D', E-E', and F-F' lines are all views from above. In FIG. 7B, play in the joystick lever 24 is not taken into account in order to make the drawing easier to understand.

When the operator rotates the joystick lever 24 from the center position by the rotation angle Gin, the operation input shaft 61 also rotates by the rotation angle Gin. On the other hand, since the response of the steering cylinders 21 and 22 is delayed, the steering angle θs gradually increases following the rotation angle Gin. This rotation angle Gin of the joystick lever 24 indicates the target steering angle, and the steering angle θs indicates the actual steering angle. The feedback input shaft 62 also rotates at the same rotation angle θs as the steering angle θs in response to a change in the steering angle θs. The feedback spool 73 also rotates along with the feedback input shaft 62, and the feedback sleeve 74 linked via the second spring 65 also rotates as a result of this rotation, Here, since the feedback sleeve 74 and the operation sleeve 72 are integrated by the first center pin 76, the second center pin 77, and the drive shaft 75, the operation sleeve 72 is also rotated by the rotation of the feedback sleeve 74.

That is, the difference in rotation angle that occurs between the rotation angle of the operation spool 71 and the rotation angle of the operation sleeve 72 corresponds to the deviation angle α (see FIG. 4B).

Since the first spring 64 biases the operation spool 71 to the neutral position Np with respect to the operation sleeve 72, in order to increase the deviation angle α, the joystick lever 24 has to be operated against the biasing force of the first spring 64.

The first spring 64 has the spring characteristic S1 shown in FIG. 7B. With the spring characteristic S1 of the first spring 64, in order to rotate the operation input shaft 61, the joystick lever 24 has to be operated with a force greater than or equal to the initial counterforce F1 (the force required to start bending the first spring 64). Also, with the spring characteristic S1 of the first spring 64, the lever counterforce increases as the deviation angle α increases. That is, as the deviation angle α increases, more force is required to operate the joystick lever 24.

As shown in FIG. 7C, in the neutral position Np where the deviation angle α is zero, the first center pin 76 is disposed in the center of the slits 71a and 71b of the operation spool 71. Also, the second center pin 77 is disposed in the center of the slits 73a and 73b of the feedback spool 73.

Then, the deviation angle α is increased by turning the joystick lever 24 to the right, for example, and when the deviation angle α reaches the angle θ2, as shown in FIG. 7D, the first center pin 76 hits the wall portion 71ae formed in the circumferential direction of the slit 71a, and the wall portion 71be formed in the circumferential direction of the slit 71b. At this point, the second center pin 77 is disposed in the center of the slits 73a and 73b of the feedback spool 73. This is because, if we let F2 be the counterforce produced by the first spring 64 when the deviation angle α is the angle θ2, the initial counterforce (the force required to start bending the second spring 65) is set to F2 as indicated by the spring characteristic S2 of the second spring 65. The initial counterforce of the second spring 65 may be set higher than F2, as long as it is equal to or greater than F2.

Furthermore, in order to rotate the joystick lever 24 to the right, the operator has to operate it against the counterforce of the second spring 65. Specifically, when the joystick lever 24 is rotated further to the right, the first center pin 76 hits the wall portion 71be and the wall portion 71ae, so if the operator tries to rotate operation spool 71, the operation sleeve 72 will have to be rotated as well. Also, as discussed above, the operation sleeve 72 is integrated with the feedback sleeve 74, and the feedback spool 73 is connected to the feedback input shaft 62. Therefore, when the joystick lever 24 is rotated further to the right, as shown in FIG. 4D, the joystick lever 24 is operated against the counterforce of the second spring 65.

When the deviation angle α reaches θ3, the second center pin 77 hits the wall portion 73ae formed in the circumferential direction of the slit 73a and the wall portion 73be formed in the circumferential direction of the slit 73b, as shown in FIG. 7E. The second center pin 77 can thus rotate by an angle of (θ3−θ2). That is, the pilot valve 42 is configured so that the deviation angle α cannot be greater than the angle θ3. Therefore, as shown in FIG. 7B, the lever counterforce rises linearly at the angle θ3. When the second center pin 77 hits the wall portions 73ae and 73be hard, it produces a sharp reaction that subjects the wrist of the operator to a load. This angle θ3 is also called the catch-up angle.

FIG. 7B illustrates an example in which the joystick lever 24 is rotated to the right, but the same holds true when it is rotated to the left, in which case the deviation angle α is a negative value, and there is left and right symmetry. That is, the first center pin 76 hits the wall portions 71ae and 71be at −θ2, and the second center pin 77 hits the wall portions 73ae and 73be at −θ3. Thus, the pilot valve 42 is configured so that the absolute value of the deviation angle α does not become greater than the angle θ3.

A difference is generated between the rotation angle of the operation spool 71 and the rotation angle of the operation sleeve 72 up until the deviation angle α reaches θ2, but once the angle θ2 is exceeded, no difference is generated in the rotation angle between the operation spool 71 and the operation sleeve 72, so the aperture of the pilot valve 42 is constant. Also, the aperture of the pilot valve 42 is constant while the deviation angle α is between the angles θ2 and θ3, but the pilot pressure may be varied according to the deviation angle by controlling the variable pressure reducer 41.

1-2-6. Configuration for Controlling Discharge Flow Rate of Steering Pump

Figure 8:
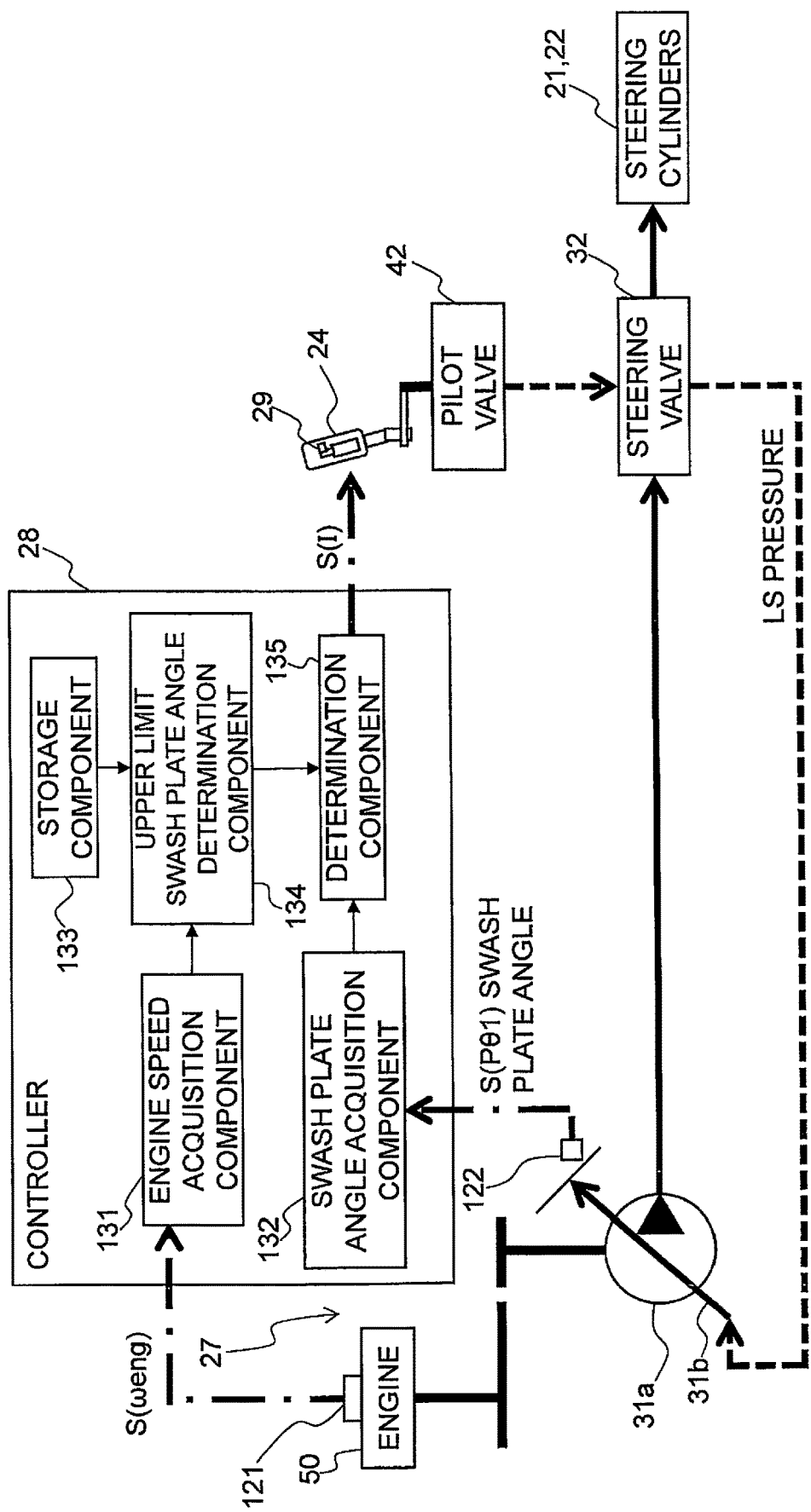
FIG. 8 is a block diagram of the configuration of the controller in FIG. 1 and of the configuration for controlling the discharge flow rate of the steering pump.

Next, a configuration for controlling the fluid discharge flow rate of the steering pump 31a will be described. FIG. 8 is a block diagram showing the configuration for controlling the swash plate angle of the steering pump 31a of the main hydraulic pressure source 31 shown in FIG. 2, and the configuration of the controller 28. In FIG. 8, the solid line indicates the flow of main hydraulic pressure, the dotted line indicates the flow of pilot pressure, and the one-dot chain line indicates an electric signal. The solid line in the controller 28 indicates the flow of information.

When the joystick lever 24 is operated to increase the deviation angle between the joystick lever 24 and the vehicle body, the aperture of the steering valve 32 also increases via the pilot valve 42, so more fluid is supplied to the steering cylinders 21 and 22, and the steering angular velocity (rate of change in the steering angle) also increases.

The steering pump 31a has a swash plate 31b, and adjusts the amount of fluid to be discharged depending on the angle of the swash plate. The angle of the swash plate 31b is also adjusted depending on the rotational speed of the engine 50. Furthermore, the angle of the swash plate 31b is adjusted depending on the load sensing pressure from the steering valve 32 (hereinafter referred to as the LS pressure).

The LS pressure indicates information about surplus flow from the steering pump 31a. The LS pressure is a hydraulic pressure for adjusting the angle of the swash plate 31b on the basis of the hydraulic pressure supplied from the steering pump 31a to the steering cylinders 21 and 22. When the swash plate angle of the swash plate 31b rises, the flow rate supplied from the steering pump 31a increases.

When the supply flow rate from the steering pump 31a is sufficient, the LS pressure is a high pressure, the LS pressure is fed back to the swash plate 31b, and the angle of the swash plate 31b is decreased. Consequently, the discharge flow rate from the steering pump 31a decreases. On the other hand, when the supply flow rate from the steering pump 31a is insufficient, the LS pressure is a low pressure, the LS pressure is fed back to the swash plate 31b, and the angle of the swash plate 31b is increased. Consequently, the discharge flow rate from the steering pump 31a increases. In this way, the discharge flow rate from the steering pump 31a is adjusted depending on the LS pressure.

As described above, the steering angular velocity rises as the deviation angle increases, but the steering angular velocity reaches its upper limit by the time the catch-up angle of ±θ3 is reached, and does not increase beyond that, instead remaining at a constant angular velocity.

Figure 9:
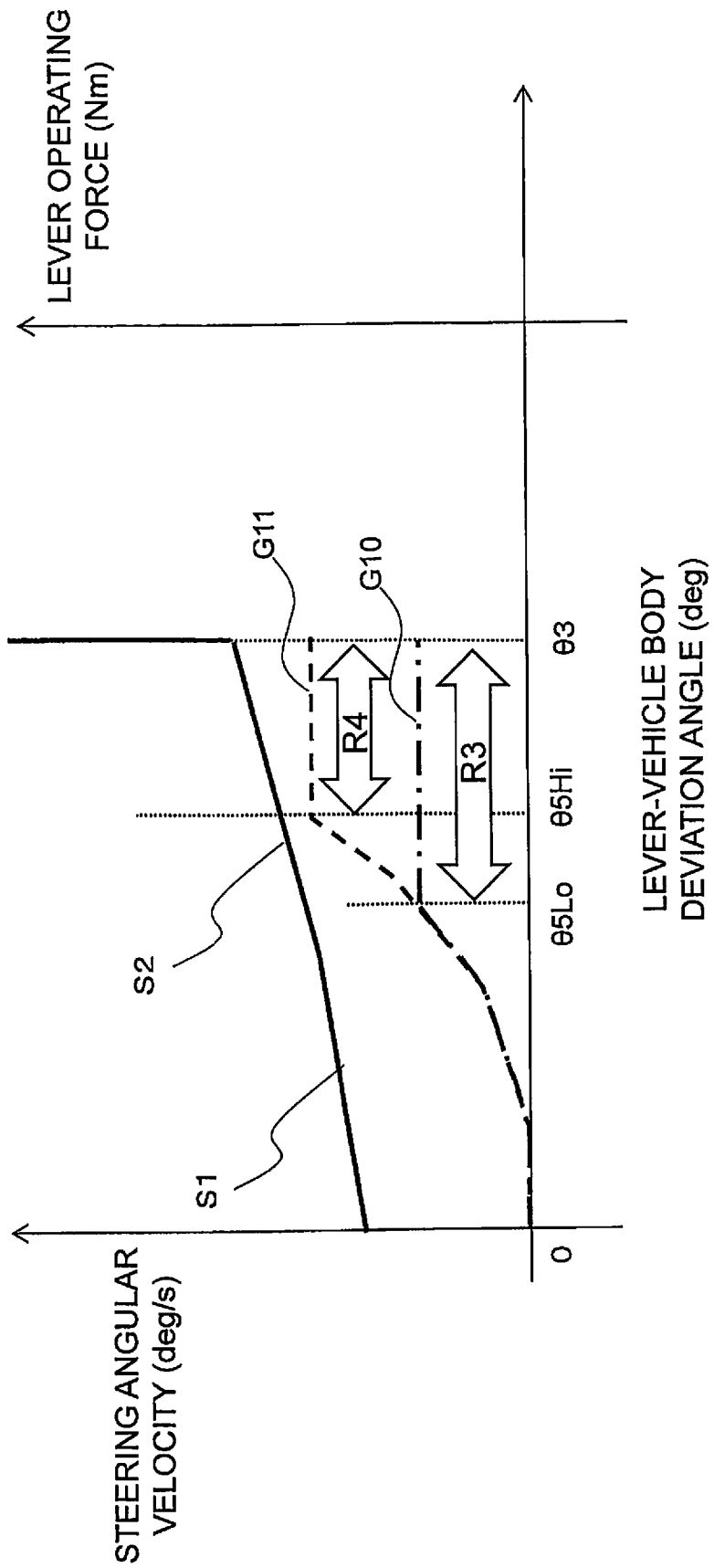
FIG. 9 is a graph of the relation between the steering angular velocity (left axis) and the deviation angle.

FIG. 9 is a graph of the relation between the steering angular velocity (left axis) and the deviation angle. In FIG. 9, the graph G10 when the engine speed is at a low idle is indicated by a one-dot chain line, and the graph G11 when the engine speed is at a high idle is indicated by a dotted line. FIG. 9 also shows the spring characteristics S1 and S2 (see FIG. 7b), which indicate the relation between the lever operating force (right axis) and the deviation angle.

As the deviation angle increases, the steering angular velocity rises, but as shown by G10, when the engine speed is at a low idle, when the deviation angle reaches θ5Lo, the steering angular velocity does not increase further, instead remaining at a constant angular velocity. That is, the steering angular velocity at a low idle reaches a maximum at the deviation angle θ5Lo.

As indicated by G11, when the engine speed is at a high idle, everything is the same as with G10 up to a deviation angle of θ5Lo, but as the deviation angle further increases from θ5Lo to θ5Hi, the steering angular velocity goes up. Once the deviation angle reaches θ5Hi, the steering angular velocity stays constant even if the deviation angle increases beyond this. That is, the steering angular velocity at a high idle reaches its maximum at a deviation angle of θ5Hi. Thus, the deviation angle at which the steering angular velocity reaches its upper limit varies with the engine speed. In this embodiment, the notification component 29 (discussed below) notifies the operator that the steering angular velocity has reached its upper limit, and this notification is performed in the region R3 in the case of a low idle, and is performed in the region R4 in the case of a high idle.

The deviation angle at which the steering angular velocity reaches its upper limit thus varies with the engine speed. This change mainly occurs because the maximum discharge flow rate depends on the engine speed. That is, since the steering angular velocity changes according to the discharge flow rate of the steering pump, it can be detected that the steering angular velocity has reached its upper limit by detecting that the discharge flow rate of the steering pump 31a has reached its maximum.

Figure 10:
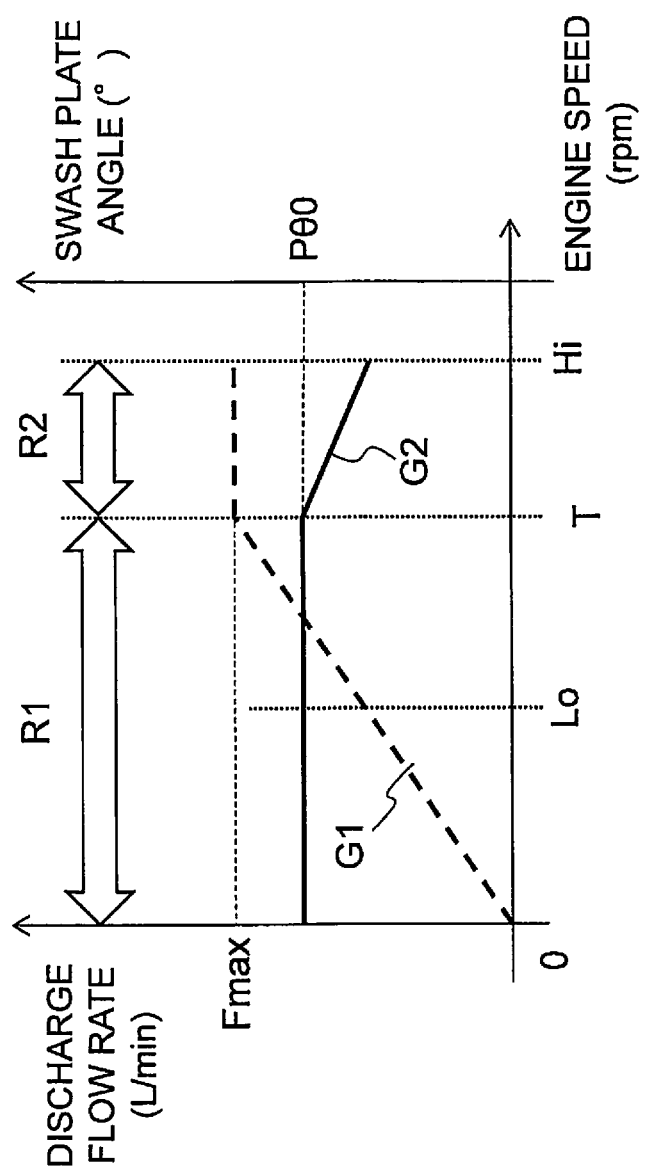
FIG. 10 is a graph of the discharge flow rate and the swash plate angle versus the engine speed.

FIG. 10 is a graph of the discharge flow rate of the pump (left vertical axis) versus the engine speed (horizontal axis). In FIG. 10, the graph G1 of the discharge flow rate of the pump (left vertical axis) versus the engine speed (horizontal axis) is indicated by a dotted line. As indicated by G1, in the region R1 where the engine speed ranges from 0 to Low to T, the discharge flow rate also increases along with the engine speed, but in the region R2 from T to Hi, the discharge flow rate remains constant even if the engine speed increases. Low indicates a low idle speed of the engine 50, and Hi indicates a high idle speed of the engine 50.

In the region R1, the swash plate angle is set to the maximum, and the flow rate increases in proportion to the increase in engine speed. In the region R2, the flow rate reaches the control maximum flow rate (Fmax in FIG. 10), so when the engine speed increases, the angle of the swash plate 31b of the steering pump 31a is reduced so that the flow rate becomes constant. Fmax can also be called the maximum discharge flow rate of which the steering pump 31a is capable when requested.

Therefore, the swash plate angle (right vertical axis) at which the discharge flow rate of the pump reaches its maximum versus the engine speed (horizontal axis) is the graph indicated by the solid line G2. In G2, in the region R1 where the engine speed ranges from 0 to Low to T, the discharge flow rate of the steering pump 31a reaches its maximum when the swash plate angle reaches the swash plate angle Pθ0, but in the region R2 from T to Hi, when the engine rotation speed rises, the swash plate angle at which the discharge flow rate reaches its maximum becomes smaller.

It can be detected that the steering angular velocity has reached its upper limit by detecting that the flow rate of the steering pump has reached its maximum flow rate, using the relation between engine speed, swash plate angle, and maximum discharge flow rate as shown in FIG. 10.

Therefore, in this embodiment, information about the engine speed and the swash plate angle, which is information for sensing the flow rate of the steering pump, is used as an example of information related to the steering angular velocity.

1-2-7. Angular Velocity Corresponding Value Sensing Unit

The angular velocity corresponding value sensing unit 27 in this embodiment senses information related to the discharge flow rate of the steering pump 31a as information related to the steering angular velocity.

The angular velocity corresponding value sensing unit 27 in this embodiment has a tachometer 121 and a swash plate angle sensor 122. The tachometer 121 senses the rotation speed of the engine 50, and transmits the sensed engine speed to the controller 28 as an engine speed signal S (ωeng). The swash plate angle sensor 122 senses the angle of the swash plate 31b of the steering pump 31a, and transmits the sensed angle as the swash plate angle signal S(Pθ1) to the controller 28.

1-2-8. Controller

The controller 28 detects that the steering angular velocity has reached its upper limit, and controls the notification component 29 (discussed below) to notify the operator that the steering angular velocity has reached its upper limit.

As shown in FIG. 8, the controller 28 mainly has an engine speed acquisition component 131, a swash plate angle acquisition component 132, a storage component 133, an upper limit swash plate angle determination component 134, and a determination component 135. The engine speed acquisition component 131 acquires the engine speed signal S(ωeng) from the tachometer 121. The swash plate angle acquisition component 132 acquires the swash plate angle signal S(Pθ1) from the swash plate angle sensor 122.

Figure 11:
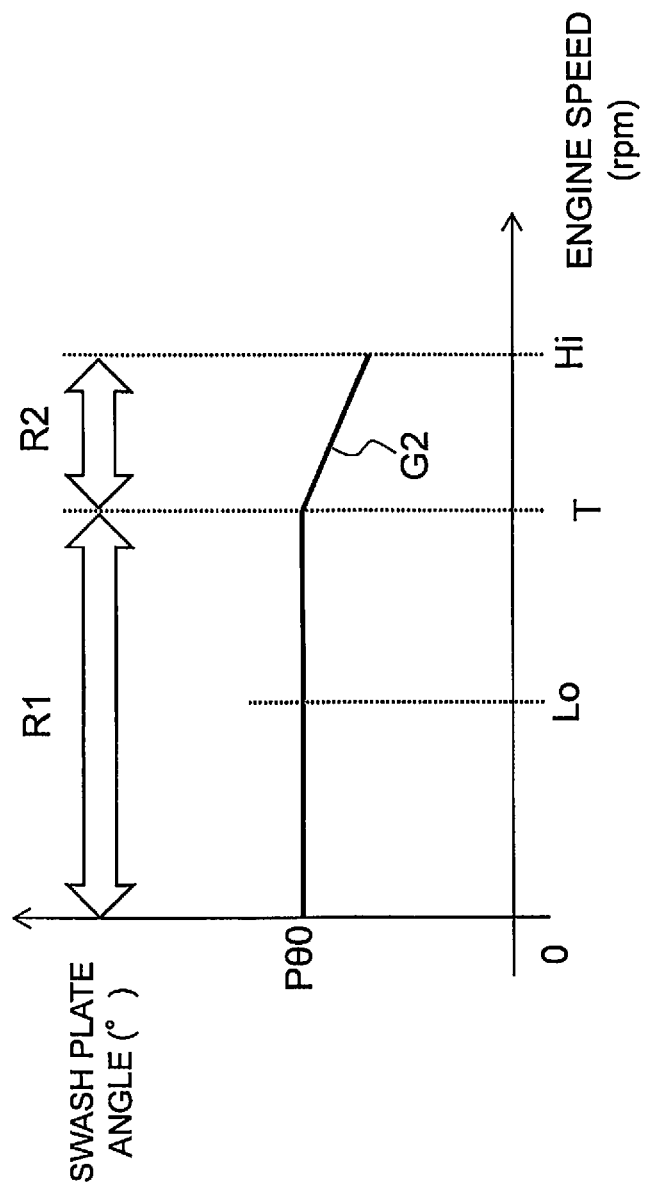
FIG. 11 is a graph showing a graph (an example of information) of the swash plate angle versus the engine speed stored in the storage component in FIG. 8.

The storage component 133 stores information about the angle of the swash plate at which the discharge flow rate of the steering pump 31a reaches its maximum versus the engine speed, and a specific value δ (discussed below). FIG. 11 shows a graph G2 (also referred to as a map) of the angle of the swash plate when the discharge flow rate of the steering pump 31a has reached its maximum versus the engine speed. This graph G2 is the solid line graph G2 in FIG. 10 discussed above. This graph G2 is stored in advance in the storage component 133. The storage component 133 may be provided inside the controller 28, or may be provided outside the controller 28. The storage component is constituted by a RAM, a ROM, a hard disk drive, or the like.

From the acquired engine speed signal S($\omega$eng), the upper limit swash plate angle determination component 134 determines the swash plate angle P$\theta$2 at which the discharge flow rate reaches its maximum at that engine speed (that is, at which the steering angle reaches its maximum) on the basis of the graph G2 shown in FIG. 11.

The determination component 135 determines whether or not the acquired swash plate angle P$\theta$1 is greater than or equal to a threshold value (P$\theta$2−$\delta$) obtained by subtracting a specific value $\delta$ from the swash plate angle P$\theta$2. If the swash plate angle P$\theta$1 is greater than or equal to the threshold value (P$\theta$2−$\delta$) (if the swash plate angle P$\theta$1 has reached the threshold value (P$\theta$2−$\delta$)), it is determined that the discharge amount of the steering pump 31a has reached the threshold flow rate. That is, when the swash plate angle P$\theta$1 approaches a difference of the specific value $\delta$ from the swash plate angle P$\theta$2 (when P$\theta$1=P$\theta$2−$\delta$), it is determined that the discharge amount of the steering pump 31a has reached the threshold flow rate.

Here, the threshold flow rate is a value set on the basis of the maximum discharge flow rate of the steering pump 31a, and is a value that is likely to reach the maximum discharge flow rate right away (could also be said to have substantially reached the maximum discharge flow rate). When the discharge flow rate of the steering pump 31a has reached the maximum discharge flow rate, the steering angular velocity could also be said to have reached the upper limit, so when the discharge flow rate of the steering pump 31a has reached the threshold value, although strictly speaking the steering angular velocity has not reached the upper limit, it is believed that the steering angular velocity will reach the upper limit right away. Therefore, when the discharge flow rate of the steering pump 31a reaches the threshold flow rate, the steering angular velocity can be said to be close to the upper limit. For example, the specific value $\delta$ can be set to 3 degrees. When the determination component 135 has determined that the steering angular velocity immediately has reached its upper limit, a command signal S(I) for notifying the operator is transmitted to the notification component 29.

The controller 28 also controls the variable pressure reducer 41 as shown in FIG. 2 on the basis of the rotation angle $\theta$in, the rotation angle $\theta$fb (=$\theta$s), and the vehicle speed V. Consequently, the original pilot pressure sent to the pilot valve 42 can be controlled so that the flow of fluid to the left and right steering cylinders 21 and 22 does not change suddenly.

Also, control of the variable pressure reducer 41 by the controller 28 may be performed by wire or wirelessly.

1-2-8. Notification Component

The notification component 29 notifies the operator of information related to the upper limit of the steering angular velocity. The notification component 29 is provided in the joystick lever 24 as shown in the detail view of the Q portion in FIG. 5. The notification component 29 has a vibrator 171 and a motor 172 that causes the vibrator 171 to vibrate.

Once it is detected that the steering angular velocity immediately has reached its upper limit, the controller 28 transmits a command signal S(I) to the notification component 29 to drive the motor 172 with a specific current. The motor 172 is driven according to the current instructed by the command signal S(I), and the vibrator 171 vibrates under drive by the motor 172. The operator can recognize that the steering angular velocity is close to the upper limit by feeling this vibration while holding the joystick lever 24.

2. Operation

The steering operation of the wheel loader 1 in this embodiment will now be described.

2-1. Steering Operation

When the joystick lever 24 is in its center position, the operation input shaft 61 is in a specific initial position, and the rotation angle $\theta$in by the operation input shaft 61 is zero. Since the steering angle $\theta$s is also zero, the feedback input shaft 62 is also in a specific initial position. In this embodiment, as shown in FIG. 7a, the steering angle $\theta$s is the angle from a state in which the state along the front-rear direction with respect to the rear frame 12 is considered to be zero. Also, as shown in FIG. 6, the rotation angle $\theta$in indicates the rotation angle from the center position of the joystick lever 24. Also, in finding the deviation angle, for example, rotation to the right may be calculated as a positive angle, and rotation to the left may be calculated as a negative angle.

At this point, the operation spool 71 is in the neutral position Np shown in FIG. 4a with respect to the operation sleeve 72. In this case, the pilot pressures of the first pilot chamber 34 and the second pilot chamber 35 of the steering valve 32 are the same, and the valve body 33 of the steering valve 32 is also in the neutral position Ns. Therefore, fluid is neither supplied to nor discharged from the left and right steering cylinders 21 and 22, the steering angle $\theta$s is maintained at zero, and the rotation angle $\theta$fb (=$\theta$s) of the feedback input shaft 62 is also maintained at zero.

Next, the operator applies the operation force Fin in order to rotate the joystick lever 24 from the center position to the right side as shown in FIG. 6. If the operation force Fin exceeds F1 of the first spring 64, the operation input shaft 61 rotates to the right just like the joystick lever 24, and the rotation angle $\theta$in of the operation input shaft 61 increases. At this point, the steering angle $\theta$s is still zero and the rotation angle $\theta$fb (=$\theta$s) of the feedback input shaft 62 is also zero, due to the delay in the response of the left and right steering cylinders 21 and 22. Therefore, the deviation angle ($\alpha$=$\theta$in −$\theta$s) between the rotation angle $\theta$in and the steering angle $\theta$s increases.

The operation spool 71 rotates to the right with respect to the operation sleeve 72 along with the rotation of the operation input shaft 61. Here, the operation sleeve 72 is integrated with the feedback sleeve 74, and the feedback sleeve 74 is linked to the feedback spool 73 by the second spring 65. The initial counterforce F2 of the second spring 65 is greater than or equal to the counterforce of the spring characteristic S1 of the first spring 64 shown in FIG. 7b. Therefore, the operation sleeve 72 does not rotate along with the operation spool 71, and the operation spool 71 rotates to the right with respect to the operation sleeve 72.

Thus, the operation spool 71 rotates to the right with respect to the operation sleeve 72 and moves to the right pilot position Rp, pilot pressure is supplied to the second pilot port P8, and pilot pressure is supplied to the second pilot chamber 35.

Consequently, the valve body 33 of the steering valve 32 moves to the right steering position Rs, fluid is supplied to the extension port 21a of the steering cylinder 21 and the contraction port 22b of the steering cylinder 22, and fluid is discharged from the contraction port 21b of the steering cylinder 21 and the extension port 22a of the steering cylinder 22. Consequently, articulation commences, the steering angle θs gradually increases, and the front frame 11 is pointed to the right with respect to the rear frame 12 (see R in FIG. 2). This change in the steering angle θs is transmitted by the link mechanism 26 to the feedback input shaft 62, and the feedback input shaft 62 rotates at the rotation angle θs.

When the operator stops the joystick lever 24 at a specific rotation angle θ1, the operation input shaft 61 also stops at the rotation angle θ1. On the other hand, since the steering angle θs is gradually increasing, the rotation angle θs of the feedback input shaft 62 also increases. The feedback spool 73 rotates along with the feedback input shaft 62, and the feedback sleeve 74 linked to the feedback spool 73 via the second spring 65 also rotates. Since the feedback sleeve 74 is integrated with the operation sleeve 72 via the first center pin 76, the second center pin 77, and the drive shaft 75, the operation sleeve 72 also rotates along with the rotation of the feedback sleeve 74. The difference in the rotation angle between the operation sleeve 72 and the operation spool 71 (the deviation angle α) decreases as the operation sleeve 72 rotates. When the steering angle θs (the rotation angle θs of the feedback input shaft 62) catches up with the rotation angle θ1 (the rotation angle θin of the operation input shaft 61), the deviation angle α drops to zero. At this point, the operation spool 71 of the pilot valve 42 is in the neutral position Np with respect to the operation sleeve 72. In this case, the pilot pressure is the same in the first pilot chamber 34 and the second pilot chamber 35 of the steering valve 32, and the steering valve 32 is also in the neutral position Ns. Accordingly, fluid is neither supplied to nor discharged from the left and right steering cylinders 21 and 22, and the steering angle θs is maintained at the rotation angle θ1.

Thus, when the joystick lever 24 is rotated to the right and stopped at the specific rotation angle θ1, the steering angle θs is also maintained at the same rotation angle θ1. Consequently, the front frame 11 is kept facing in the direction of the rotation angle θ1, to the right with respect to the rear frame 12.

Next, when the operator returns the joystick lever 24 from the right side position toward the center position, the operation input shaft 61 similarly rotates, and the rotation angle θin of the operation input shaft 61 decreases. At this point, because of the delay in the response of the left and right steering cylinders 21 and 22, the steering angle θs is still in the state of the rotation angle θ1. Therefore, the rotation angle difference a (=θin −θs) decreases from zero to a negative value. The operation spool 71 then rotates to the left with respect to the operation sleeve 72 and moves to the left pilot position Lp, and pilot pressure is supplied to the first pilot port P7. Consequently, the valve body 33 of the steering valve 32 moves to the left steering position Ls, fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22. This gradually reduces the steering angle θs from the rotation angle θ1. This change in the steering angle θs is transmitted by the link mechanism 26 to the feedback input shaft 62, and the feedback input shaft 62 rotates at the same change in the rotation angle as the change in the steering angle θs.

When the operator stops the joystick lever 24 in the center position, the operation input shaft 61 also stops in the initial position, that is, in the position where the rotation angle θin is zero. Meanwhile, since the steering angle θs is also gradually decreasing from the rotation angle θ1, the rotation angle difference (deviation angle) a gradually decreases. When the steering angle θs drops to zero, the rotation angle θfb of the feedback input shaft 62 (=θs) also goes to zero, and the rotation angle difference a goes to zero. At this point, the operation spool 71 is in the neutral position Np with respect to the operation sleeve 72. In this case, the pilot pressure is the same in the first pilot chamber 34 and the second pilot chamber 35 of the steering valve 32, and the steering valve 32 is also in the neutral position Ns. Therefore, fluid is neither supplied to nor discharged from the left and right steering cylinders 21 and 22, and the steering angle θs also returns to zero and is maintained there. Consequently, the front frame 11 is returned to an orientation along the longitudinal direction with respect to the rear frame 12.

When the joystick lever 24 is rotated to the left side, everything is the same as above, and therefore will not be described again.

2-2. Notification that Steering Angular Velocity has Reached Upper Limit

Next, control for notifying the operator that the steering angular velocity is close to the upper limit when the joystick lever 24 has been operated as above will be described.

Figure 12:
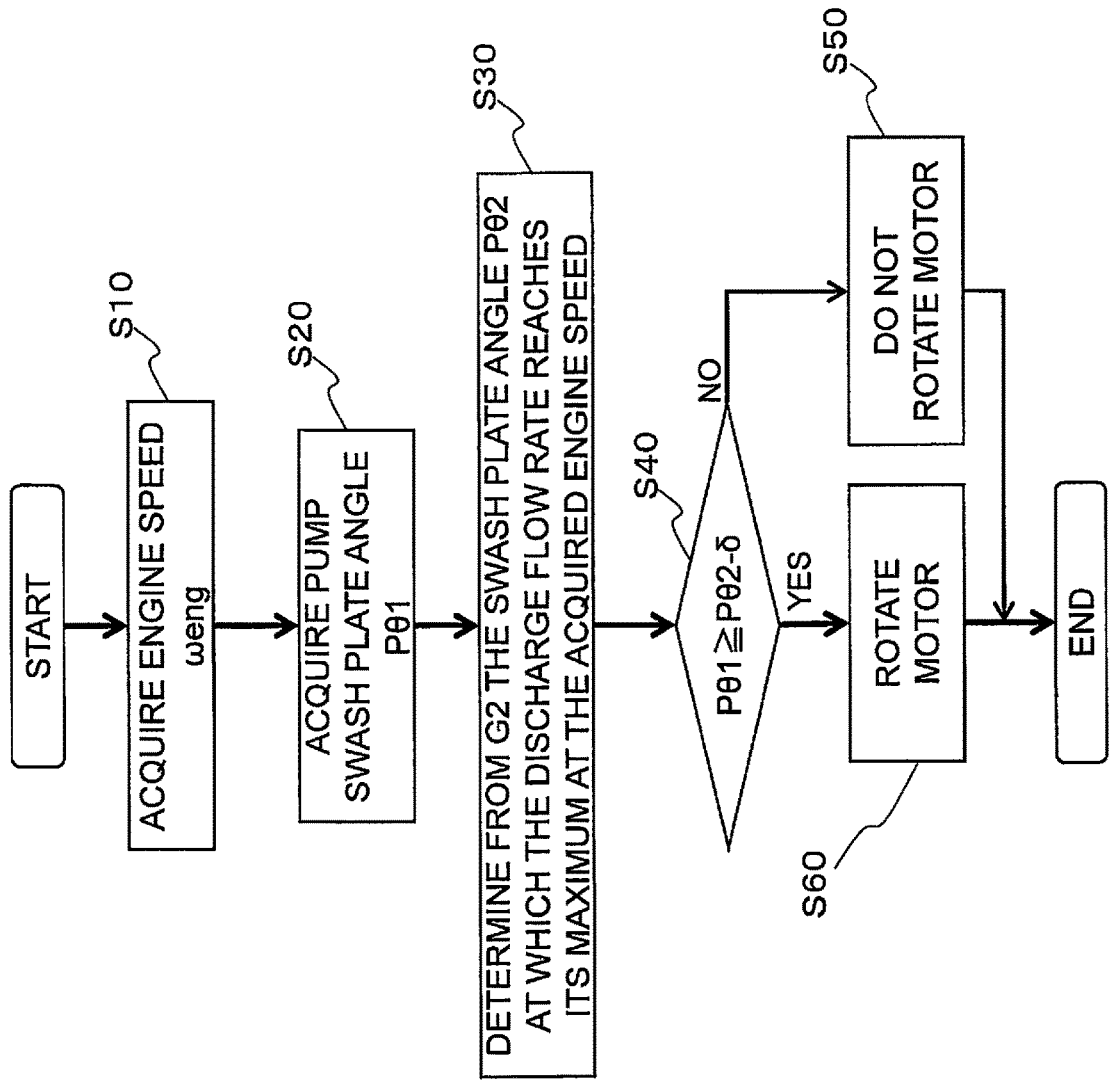
FIG. 12 is a flowchart of a method for controlling a wheel loader in Embodiment 1 of the present invention.

FIG. 12 is a flowchart showing the control operation related to notification that the steering angular velocity of the wheel loader 1 in this embodiment has reached the upper limit.

First, in step S10, the engine speed acquisition component 131 of the controller 28 acquires the engine speed ωeng of the engine 50 from the tachometer 121.

Next, in step S20, the swash plate angle acquisition component 132 of the controller 28 acquires the swash plate angle Pθ1 of the swash plate 31b of the steering pump 31a from the swash plate angle sensor 122.

Next, in step S30, from the acquired engine speed signal S(ωeng), the upper limit swash plate angle determination component 134 determines the swash plate angle Pθ2 at which the discharge flow rate reaches its maximum at that engine speed (that is, at which the steering angle velocity reaches its upper limit) on the basis of the graph G2 shown in FIG. 11.

Next, in step S40, the determination component 135 determines whether or not the acquired swash plate angle Pθ1 is greater than or equal to a threshold value (Pθ2−δ) obtained by subtracting the specific value δ from the swash plate angle Pθ2. The specific value δ can be set to 3 degrees, for example. When the swash plate angle Pθ1 is less than the threshold value (Pθ2−δ) (when the swash plate angle Pθ1 has not reached the threshold value (Pθ2−δ)), the control proceeds to step S50, and rotational drive of the motor 172 is not performed.

On the other hand, when the swash plate angle Pθ1 is greater than or equal to the threshold value (Pθ2−δ) (when the swash plate angle Pθ1 has reached the threshold value (Pθ2−δ)), the control proceeds to step S60, and the signal S(I) is transmitted to the notification component 29. The motor 172 of the notification component 29 is then rotationally driven according to the command signal, and the vibrator 141 vibrates. When the steering angular velocity comes close to the upper limit, the operator can be notified to that effect by repeating the control of the above steps S10 to S60 during a steering operation.

In step S40, the determination component 135 may determine whether or not the difference obtained by subtracting the acquired swash plate angle Pθ1 from the swash plate angle Pθ2 is less than or equal to the specific value δ (whether Pθ2−Pθ1 has reached δ). If the difference between the swash plate angle Pθ2 and the swash plate angle Pθ1 is greater than the specific value δ, the control proceeds to step S50, and the rotational drive of the motor 172 is not performed. If the difference between the swash plate angle Pθ2 and the swash plate angle Pθ1 is less than or equal to the specific value δ, the control proceeds to step S60, and the vibrator 141 vibrates.

Figure 13:
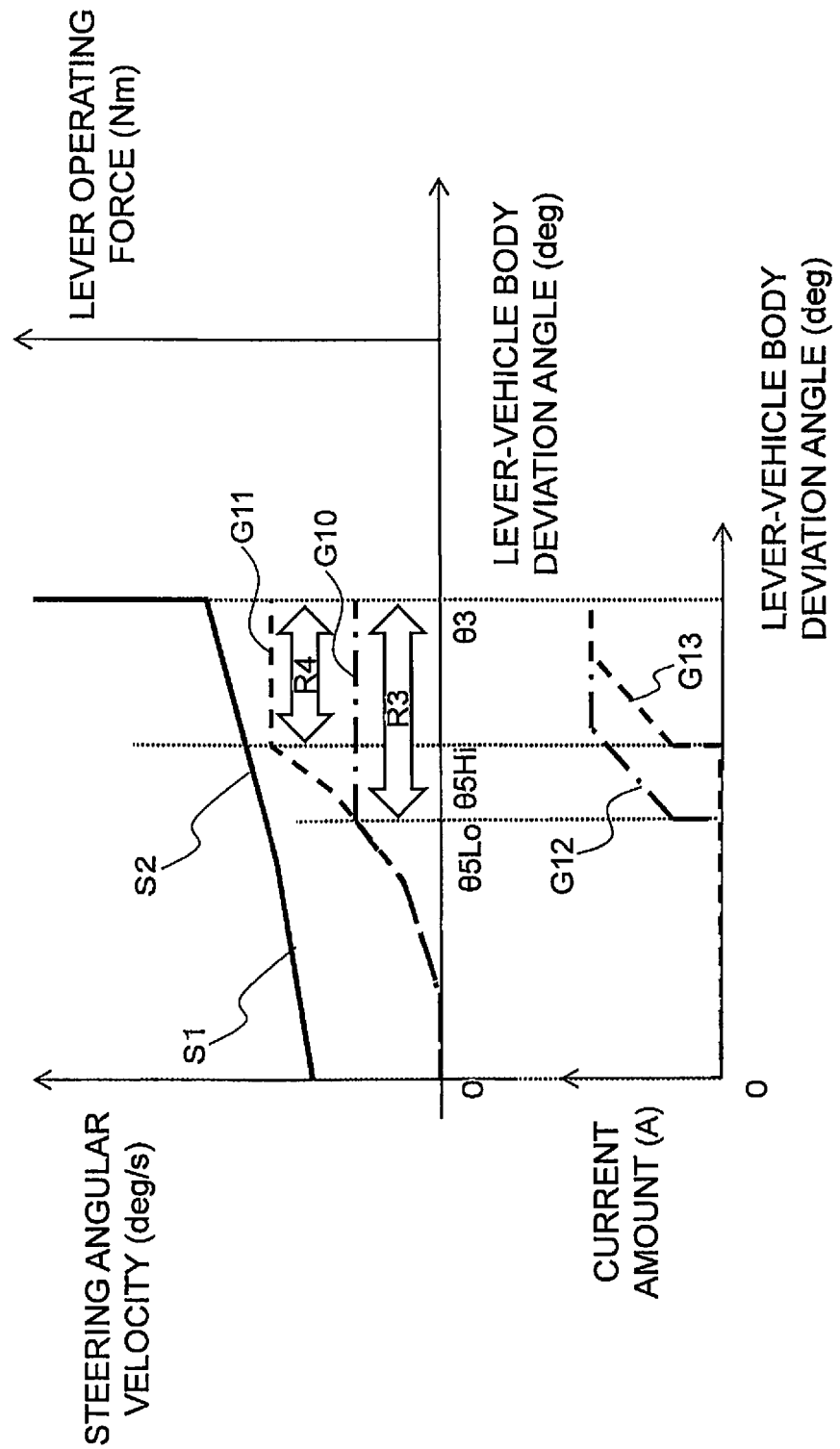
FIG. 13 is a graph of the amount of current supplied to the motor versus the deviation angle in the control method shown in FIG. 12.

FIG. 13 is a diagram in which the graphs G12 and G13 of the amount of current applied to the motor 172 are further added to FIG. 9. The graph G12 shows the amount of current applied to the motor 172 when the engine speed is at low idle. The graph G13 shows the amount of current applied to the motor 172 when the engine speed is at high idle. This allows the vibrator 171 to be vibrated at a deviation angle of θ5Lo or more when the engine speed is low idle. Also, when the engine speed is at high idle, the vibrator 141 can be vibrated when at a deviation angle of θ5Hi or above.

The vibration by the vibrator 141 may be performed for a specific length of time, or may be performed until the deviation angle reaches the catch-up angle (±θ3), as shown in FIG. 13. For example, the controller 28 acquires the rotation angle θin sensed by the first rotation angle sensor 101 and the rotation angle θfb (=θs) sensed by the second rotation angle sensor 102, and calculates θin −θfb to find the deviation angle α.

Embodiment 2

The basic configuration of the wheel loader in Embodiment 2 is the same as that in Embodiment 1, but the configuration of the controller and the angular velocity corresponding value sensing unit for sensing information related to the steering angular velocity is different. More specifically, with the wheel loader 1 in Embodiment 1, it is detected that the steering angular velocity is close to its upper limited by detecting that the discharge flow rate of the steering pump 31a has reached the threshold flow rate on the basis of the rotational speed of the engine 50 and the swash plate angle, but in Embodiment 2 it is detected that the discharge amount of the steering pump 31a has reached the threshold flow rate on the basis of the rotational speed of the engine 50 and the LS pressure. Therefore, Embodiment 2 will be described by focusing on what is different from Embodiment 1. In Embodiment 2, those components that are the same as in Embodiment 1 will be numbered the same.

1. Configuration 1-1. Angular Velocity Corresponding Value Sensing Unit

Figure 14:
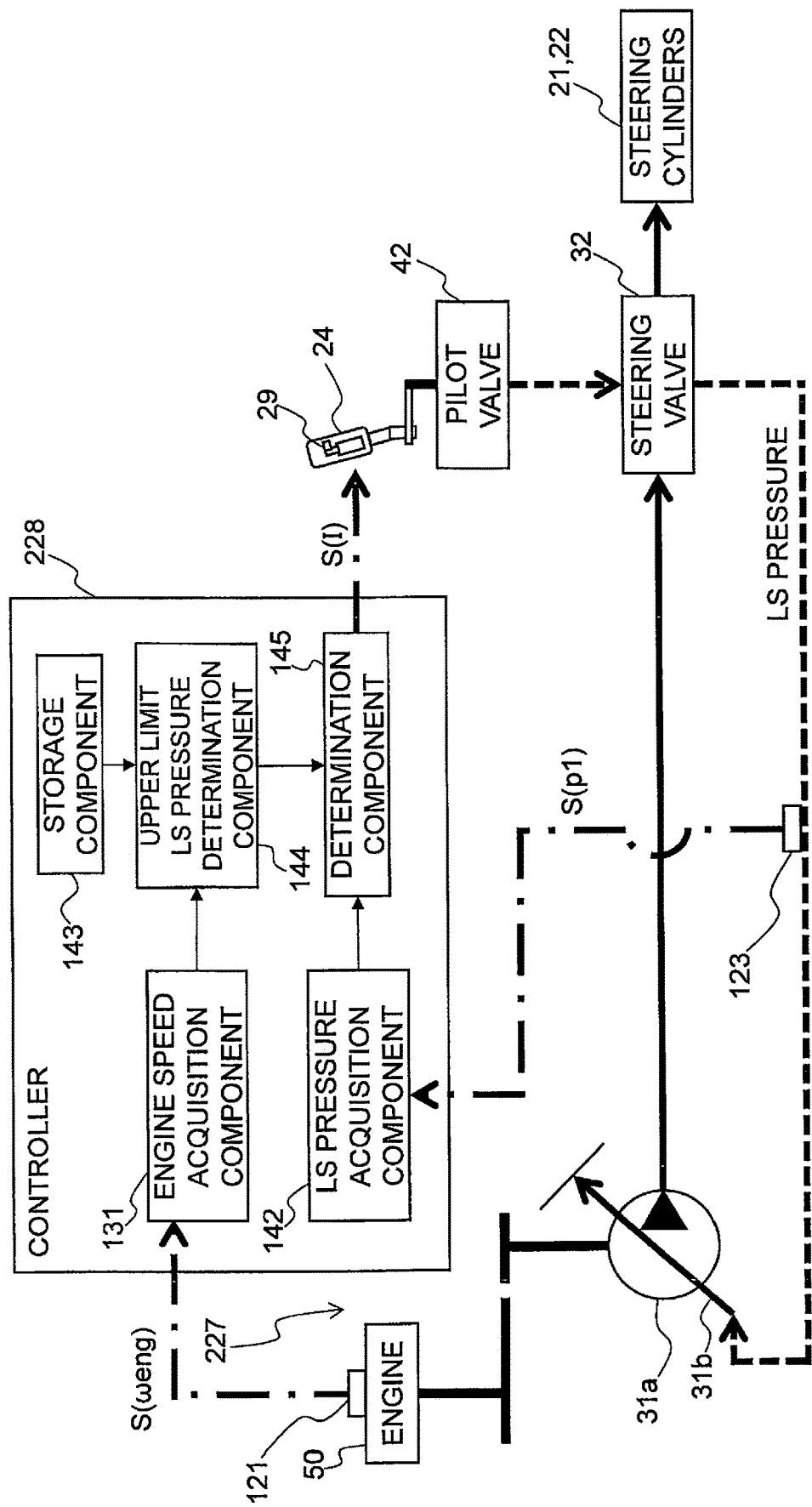
FIG. 14 is a block diagram of the configuration of a controller and the configuration for controlling the discharge flow rate of the steering pump in Embodiment 2 of the present invention.

FIG. 14 is a block diagram of the control configuration of the wheel loader 1 in Embodiment 2. As shown in the drawing, the angular velocity corresponding value sensing unit 227 in Embodiment 2 has the tachometer 121 and an LS pressure sensor 123.

The tachometer 121 senses the rotation speed of the engine 50, and transmits the sensed engine speed to the controller 228 as an engine speed signal S(ωeng). The LS pressure sensor 123 senses the LS pressure in the steering valve 32, and transmits the sensed LS pressure as an LS pressure signal S(p1) to the controller 228.

1-2. Controller

The controller 228 mainly has the engine speed acquisition component 131, an LS pressure acquisition component 142, a storage component 143, an upper limit LS pressure determination component 144, and a determination component 145. The engine speed acquisition component 131 acquires the engine speed signal S(ωeng) from the tachometer 121. The LS pressure acquisition component 142 acquires the LS pressure signal S(p1) from the LS pressure sensor 123.

Figure 15:
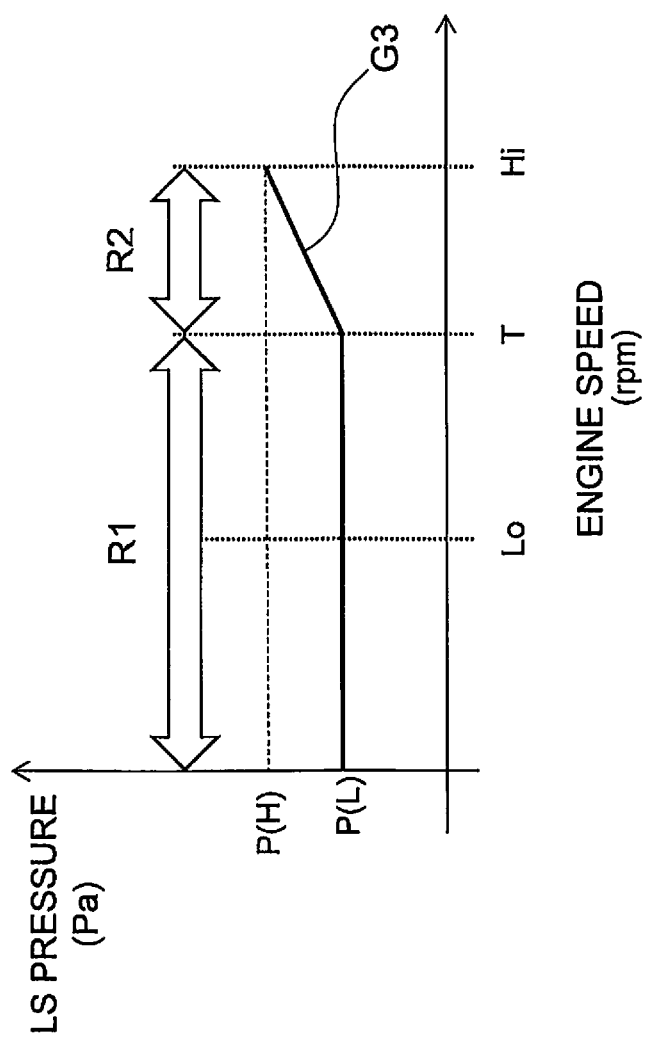
FIG. 15 is a graph (an example of information) of the load sensing pressure versus the engine speed stored in the storage component in FIG. 14.

Information about a specific value β (discussed below) and the LS pressure at which the flow rate of the steering pump 31a reaches its upper limit versus the engine speed is stored in advance in the storage component 143. FIG. 15 shows a graph G3 (also referred to as a map) indicating the LS pressure when the discharge flow rate of the steering pump 31a has reached its maximum flow rate versus the engine speed. As indicated by G3, the LS pressure is set to p(L) in the region R1 where the engine speed is from 0 to Low to T. Also, the LS pressure is set to gradually increase from p(L) to p(H) in the region R2 where the engine speed is from T to Hi. Regions R1 and R2 are the same as those in Embodiment 1. In the region R1, the swash plate angle is set to maximum, and the flow rate increases in proportion to the increase in engine speed. In the region R2, the maximum control flow rate has been reached, so when the engine speed increases, the angle of the swash plate 31b of the steering pump 31a is decreased so that the flow rate will remain constant. When the steering angular velocity is low, the LS pressure has a value higher than G3. As the amount of lever operation increases and the steering angular velocity increases, the LS pressure decreases, and when the steering angular velocity reaches its upper limit, the LS pressure becomes equal to the G3.

It can be detected that the steering angular velocity has reached its upper limit by detecting that the flow rate of the steering pump has reached the maximum flow rate by using the relation between engine speed, LS pressure, and maximum discharge flow rate as shown in FIG. 15. That is, in this embodiment, information about the LS pressure and the engine speed, which is information for sensing the flow rate of the steering pump, is used as an example of information related to the steering angular velocity. The storage component 143 may be provided inside the controller 228, or it may be provided outside the controller 228. The storage component is constituted by a RAM, a ROM, a hard disk drive, and so forth.

From the acquired engine speed signal S (ωeng), the upper limit LS pressure determination component 144 determines the LS pressure p2 at which the discharge flow rate reaches its maximum at that engine speed (that is, at which the steering angle velocity reaches its upper limit) on the basis of the graph G3 shown in FIG. 15.

The determination component 145 determines whether or not the LS pressure p1 acquired from the LS pressure sensor 123 via the LS pressure acquisition component 142 is less than or equal to a threshold (p2+β) obtained by adding a specific value β to the LS pressure p2. If the LS pressure p1 is less than or equal to the threshold (p2+β) (if the LS pressure p1 has reached p2+β), the determination component 145 determines that the discharge flow rate of the steering pump 31a has reached the threshold flow rate and the steering angular velocity is close to its upper limit. That is, when the LS pressure p1 is close to the LS pressure p2 by the difference of the specific value β, it is determined that the discharge amount of the steering pump 31a has reached the threshold flow rate. For instance, the specific value β can be set to 0.1 MPa. When the determination component 145 determines that the steering angular velocity is close to its upper limit, the determination component 145 transmits a command signal to the notification component 29 to notify the operator.

2. Operation

Next, a control operation for notifying the operator that the steering angular velocity is close to its upper limit when the joystick lever 24 is operated will be described.

Figure 16:
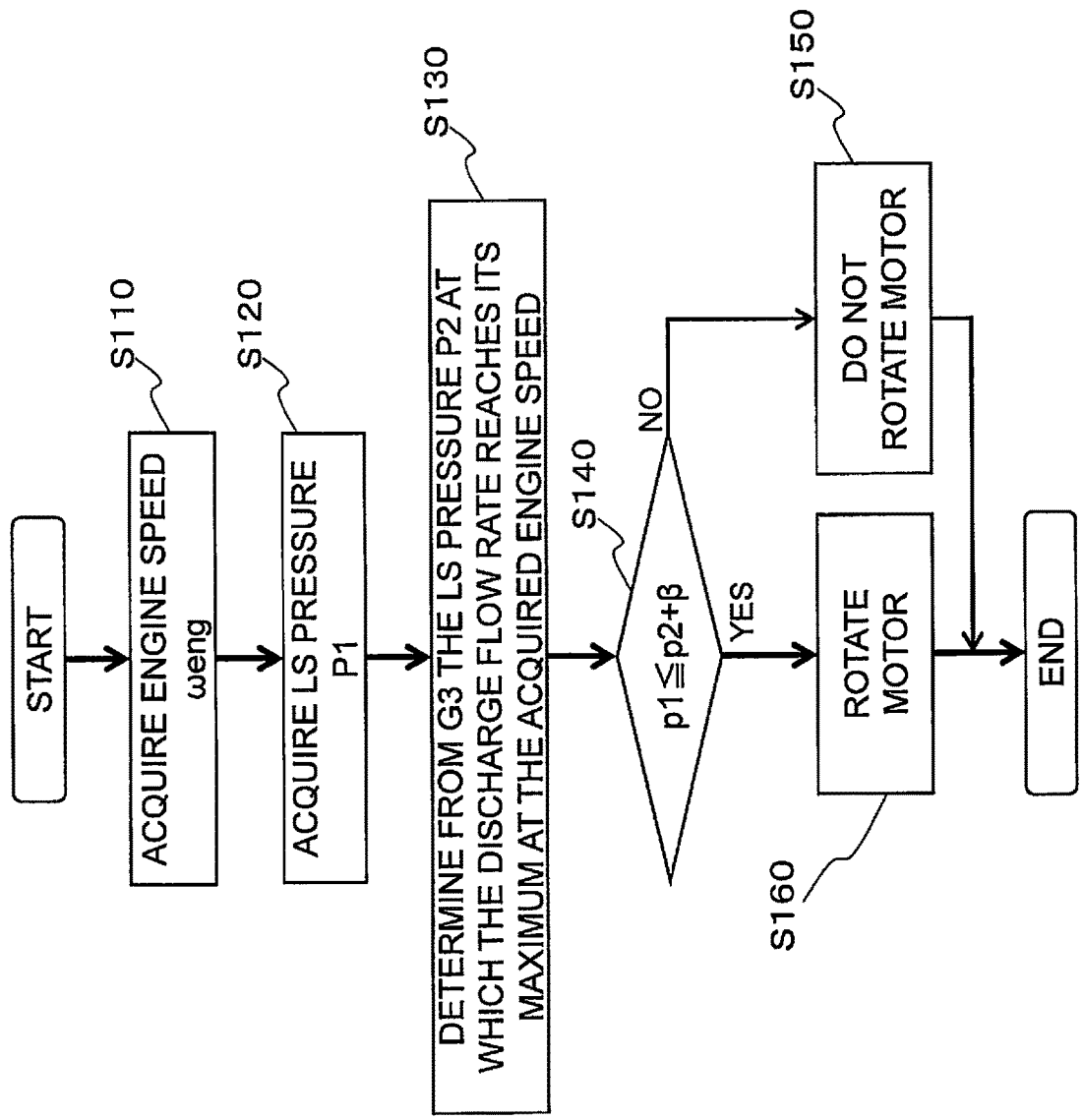
FIG. 16 is a flowchart of the method for controlling a wheel loader in Embodiment 2 of the present invention.

FIG. 16 is a flowchart of the control operation related to notification that the steering angular velocity of the wheel loader 1 in this embodiment has reached its upper limit.

First, in step S110, the engine speed acquisition component 131 of the controller 228 acquires the rotation speed ωeng of the engine 50 from the tachometer 121.

Next, in step S120, the LS pressure acquisition component 142 of the controller 228 acquires the LS pressure p1 from the LS pressure sensor 123.

Next, in step S130, from the acquired engine speed signal S(ωeng), the upper limit LS pressure determination component 144 determines the LS pressure p2 at which the discharge flow rate reaches the threshold flow rate at that engine speed (that is, at which the steering angle velocity approaches its upper limit) on the basis of the graph G3 shown in FIG. 15.

Next, in step S140, the determination component 155 determines whether or not the acquired LS pressure p1 is less than or equal to the threshold (p2+β) obtained by adding the specific value β to the LS pressure p2. If the LS pressure p1 is greater than the threshold value (p2+β) (if the LS pressure p1 has not reached the threshold value), the control proceeds to step S150, and the rotational drive of the motor 172 is not performed.

On the other hand, if the LS pressure p1 is less than or equal to the threshold value (p2+β) (if the LS pressure p1 has reached the threshold value), the control proceeds to step S160, and the command signal S(I) is transmitted to the notification component 29. Then, the motor 172 of the notification component 29 is rotationally driven according to the command signal, and the vibrator 171 vibrates.

The control in steps S110 to S160 can be performed repeatedly during a steering operation to notify the operator when the steering angular velocity approaches its upper limit.

In step S140, the determination component 155 may determine whether or not the difference obtained by subtracting the LS pressure p2 from the acquired LS pressure p1 is less than or equal to the specific value β. If the value obtained by subtracting the LS pressure p2 from the LS pressure p1 is greater than the specific value β, the control proceeds to step S150, and the rotational drive of the motor 172 is not performed. If the difference obtained by subtracting the LS pressure p2 from the LS pressure p1 is less than or equal to the specific value β, the control proceeds to step S160, and the vibrator 141 vibrates.

Embodiment 3

The basic configuration of the wheel loader Embodiment 3 is the same as in Embodiment 1, but the configuration of the controller and the angular velocity corresponding value sensing unit for sensing information related to the steering angular velocity is different. More specifically, with the wheel loader 1 in Embodiment 1, it is detected that the steering angular velocity is close to its upper limited by detecting that the discharge flow rate of the steering pump 31a has reached the threshold flow rate on the basis of the rotational speed of the engine 50 and the swash plate angle, but in Embodiment 3 it is detected that the steering angular velocity is close to its upper limit on the basis of the rotational speed of the engine 50 and the deviation angle α. Therefore, Embodiment 3 will be described by focusing on what is different from Embodiment 1. In Embodiment 3, those components that are the same as in Embodiment 1 will be numbered the same.

1. Configuration 1-1. Angular Velocity Corresponding Value Sensing Unit

Figure 17:
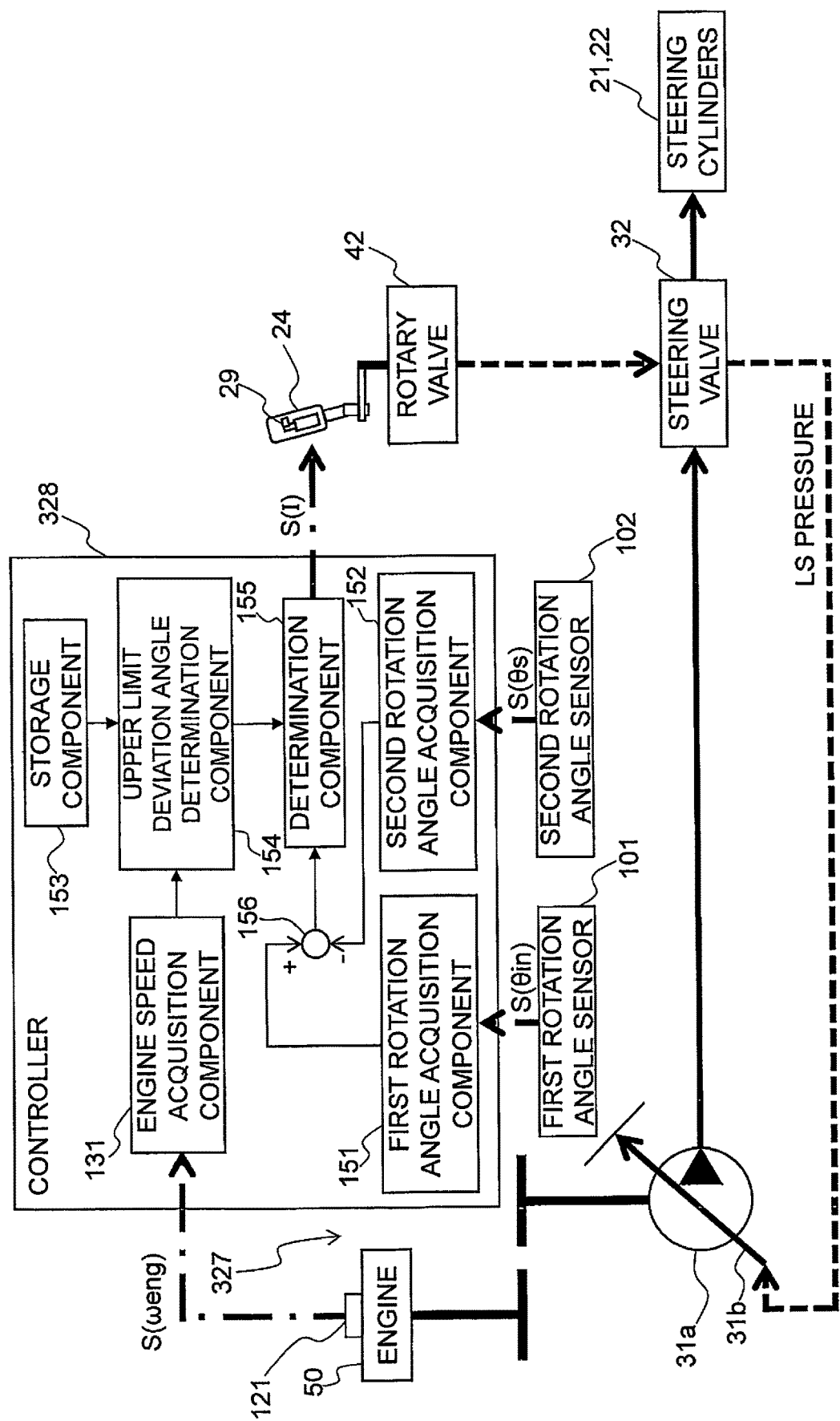
FIG. 17 is a block diagram of the configuration of a controller and the configuration for controlling the discharge flow rate of the steering pump in Embodiment 3 of the present invention.

FIG. 17 is a block diagram of the configuration for controlling the wheel loader 1 in Embodiment 3. As shown in the drawing, the angular velocity corresponding value sensing unit 327 in Embodiment 3 includes the tachometer 121, the first rotation angle sensor 101, and the second rotation angle sensor 102.

The tachometer 121 senses the rotation speed of the engine 50, and transmits the sensed engine speed as the engine speed signal S(ωeng) to the controller 328. As described above, the first rotation angle sensor 101 senses the rotation angle θin of the operation input shaft 61, and transmits the sensed rotation angle as the rotation angle signal S(θin) to the controller 328. The second rotation angle sensor 102 senses the rotation angle θfb (=θs) of the feedback input shaft 62. The second rotation angle sensor 102 transmits the sensed rotation angle as a rotation angle signal S(θfb) to the controller 328.

1-2. Controller

The controller 328 mainly has the engine speed acquisition component 131, a first rotation angle acquisition component 151, a second rotation angle acquisition component 152, a calculator 156, a storage component 153, an upper limit deviation angle determination component 154, and a determination component 155. The engine speed acquisition component 131 acquires the engine speed signal S(ωeng) from the tachometer 121. The first rotation angle acquisition component 151 acquires the rotation angle θin of the joystick lever 24 from the first rotation angle sensor 101. The second rotation angle acquisition component 152 acquires the rotation angle θfb (=θs) of the feedback input shaft 62 from the second rotation angle sensor 102. The calculator 156 calculates θin −θfb to obtain the deviation angle α (termed θ4 in this embodiment).

Figure 18:
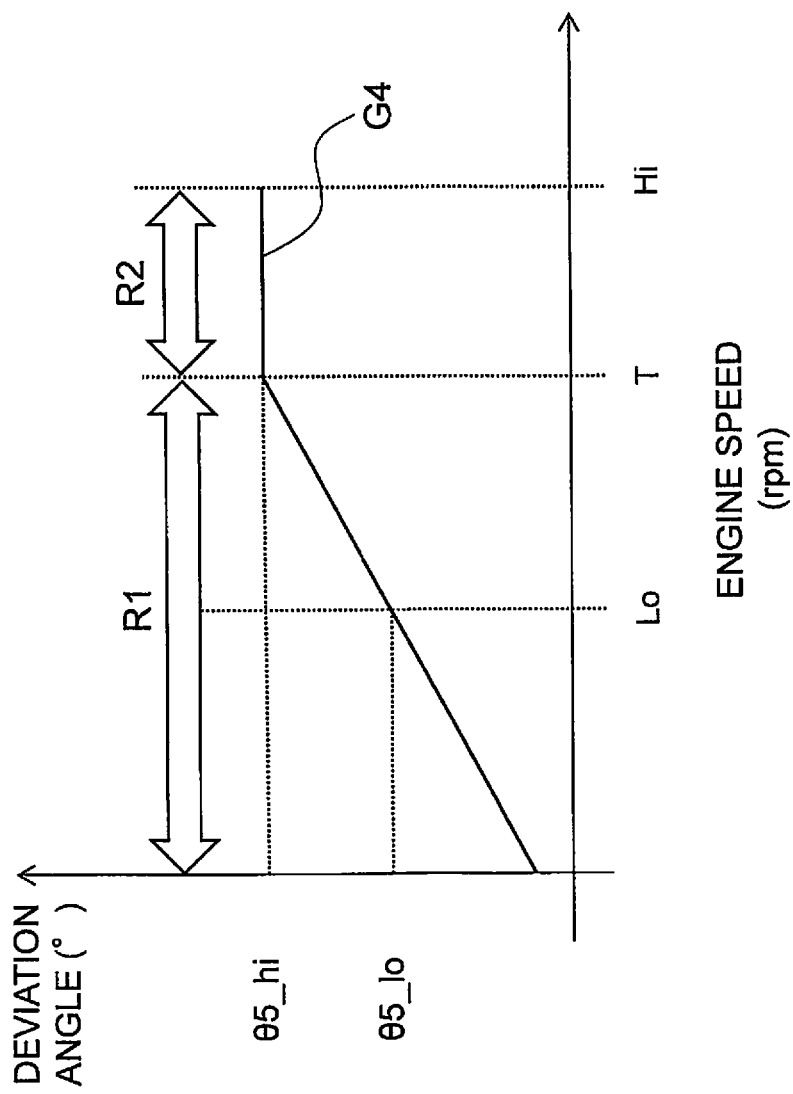
FIG. 18 is a graph (an example of information) of the load sensing pressure versus the engine speed stored in the storage component in FIG. 17.

The storage component 153 pre-stores information about the deviation angle at which the flow rate of the steering pump 31a reaches its upper limit versus the engine speed and a specific value γ (discussed below). FIG. 18 shows a graph G4 (also referred to as a map) of the deviation angle when the discharge flow rate of the steering pump has reached the maximum flow rate versus the engine speed. As indicated by G4, in the region R1 where the engine speed is 0 to Low to T, the deviation angle is set to gradually increase at a specific slope. In the region R2 where the engine speed is from T to Hi, the deviation angle is a constant value which is the deviation angle θ5hi. The regions R1 and R2 are the same as in the Embodiment 1. In the region R1, the swash plate angle is set to the maximum, and the flow rate increases in proportion to an increase in engine speed. In the region R2, the maximum control flow rate has been reached, so when the engine speed increases, the angle of the swash plate 31b of the steering pump 31a is decreased so that the flow rate will remain constant.

It can be detected that the steering angular velocity is close to its upper limit by using the relation between engine speed, deviation angle, and maximum discharge flow rate as shown in FIG. 18 to detect that the flow rate of the steering pump 31a has reached the threshold flow rate. That is, in this embodiment, information about engine speed and deviation angle, which is information for sensing the flow rate of the steering pump 31a, is used as an example of information related to the steering angular velocity. The storage component 153 may be provided inside the controller 328 or outside the controller 328. The storage component is constituted by a RAM, a ROM, a hard disk drive, or the like.

From the acquired engine speed, the upper limit deviation angle determination component 154 determines the deviation angle θ5 at which the discharge flow rate reaches its maximum at that engine speed (that is, at which the steering angle velocity reaches its upper limit) on the basis of the graph G4 shown in FIG. 18.

The determination component 155 determines whether or not the deviation angle θ4 calculated by the calculator 156 is greater than or equal to a threshold (θ5−γ) obtained by subtracting the specific value γ from the deviation angle θ5. If the deviation angle θ4 is equal to or larger than the threshold value (θ5−γ) (if the deviation angle θ4 reaches the threshold value (θ5−γ)), the determination component 155 determines that the discharge flow rate of the steering pump 31a has reached the threshold flow rate, and that the steering angular velocity is close to its upper limit. When the determination component 155 determines that the steering angular velocity is close to its upper limit, the determination component 155 transmits a command signal telling the notification component 29 to notify the operator.

2. Operation

Next, the control operation for notifying the operator that the steering angular velocity is close to its upper limit when the joystick lever 24 has been operated will be described.

Figure 19:
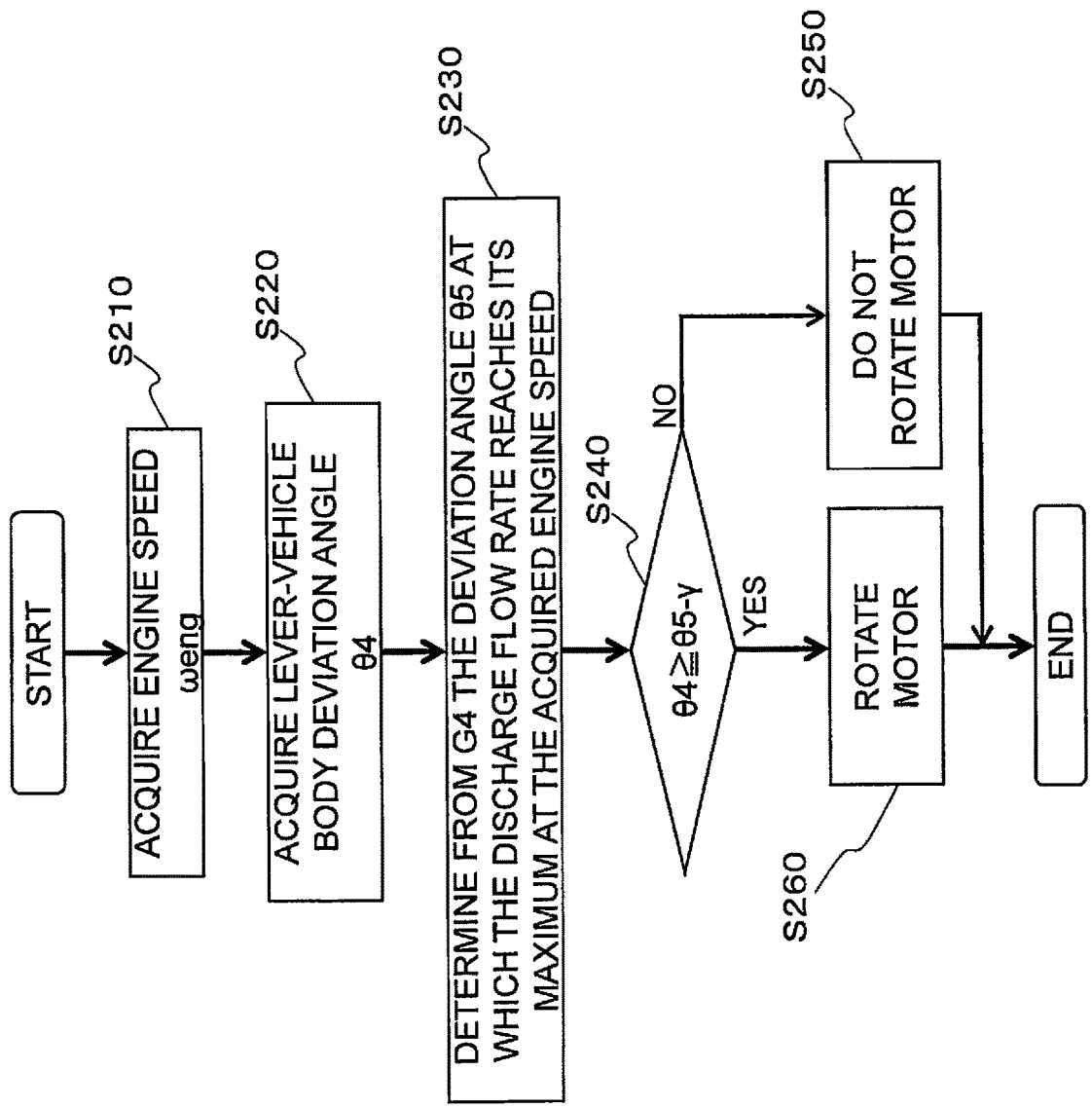
FIG. 19 is a flowchart of a method for controlling a wheel loader in Embodiment 3 of the present invention.

FIG. 19 is a flowchart of the control operation related to the notification of reaching the upper limit of steering angular velocity in the wheel loader 1 in this embodiment.

First, in step S210, the engine speed acquisition component 131 of the controller 328 acquires the rotation speed ωeng of the engine 50 from the tachometer 121.

Next, in step S220, the deviation angle θ4 is acquired. More precisely, the first rotation angle acquisition component 151 acquires the rotation angle θin of the joystick lever 24 from the first rotation angle sensor 101. The second rotation angle acquisition component 152 acquires the rotation angle θfb (=θs) of the feedback input shaft 62 from the second rotation angle sensor 102. Then, the calculator 156 calculates θin −θfb to find the deviation angle θ4.

Next, in step S230, the upper limit deviation angle determination component 154 determines from the acquired engine speed signal S(ωeng), on the basis of the graph G4 shown in FIG. 18, the deviation angle θ5 at which the discharge flow rate reaches its maximum at that engine speed (that is, at which the steering angle velocity reaches its upper limit).

Next, in step S240, the determination component 155 determines whether or not the acquired deviation angle θ4 is greater than or equal to the threshold value (θ5−γ) obtained by subtracting the specific value γ from the deviation angle θ5. If the deviation angle θ4 is below the threshold value (θ5−γ) (if the deviation angle θ4 has not reached the threshold value (θ5−γ)), control proceeds to step S250 and the motor 172 is not rotationally driven.

On the other hand, if the deviation angle θ4 is greater than or equal to the threshold value (θ5−γ) (if the deviation angle θ4 has reached the threshold value (θ5−γ)), control proceeds to step S260 and the command signal S(I) is transmitted to the notification component 29. Then, the motor 172 of the notification component 29 is rotationally driven according to the command signal, and the vibrator 141 vibrates.

In step S240, the determination component 155 may determine whether or not the remainder obtained by subtracting the obtained deviation angle θ4 from the deviation angle θ5 is less than or equal to the specific value γ. If the remainder obtained by subtracting the deviation angle θ4 from the deviation angle θ5 is greater than the specific value γ, control proceeds to step S250, and the motor 172 is not rotationally driven. If the remainder obtained by subtracting the deviation angle θ4 from the deviation angle θ5 is less than or equal to the specific value γ, control proceeds to step S260 and the vibrator 141 vibrates.

When the steering angular velocity approaches its upper limit, the operator is notified to that effect by repeatedly performing the control in the above steps S210 to S260 during the steering operation.

Features, etc.

(1)

The wheel loader 1 (an example of a work vehicle) in Embodiments 1 to 3 comprises the steering cylinders 21 and 22 (an example of a hydraulic actuator), the steering pump 31a (an example of a hydraulic pump), the joystick lever 24 (an example of an operation member), the pilot valve 42 (an example of a control valve), the angular velocity corresponding value sensing unit 27, 227, or 327, the notification component 29, and the controller 28, 228, or 328. The steering cylinders 21 and 22 change the steering angle θs on the basis of the supplied fluid. The steering pump 31a supplies fluid to the steering cylinders 21 and 22. The joystick lever 24 is operated by the operator when changing the steering to angle θs. The pilot valve 42 controls the flow of fluid supplied from the steering pump 31a to the steering cylinders 21 and 22 on the basis of how much the joystick lever 24 is operated. The angular velocity corresponding value sensing unit 27, 227, or 327 senses a corresponding value that corresponds to the steering angular velocity varied on the basis of the fluid flow rate. The notification component 29 notifies the operator that the corresponding value has reached a threshold value preset on the basis of the upper limit of the steering angular velocity. When it is detected that the corresponding value has reached the threshold value, the controller 28, 228, or 328 tells the notification component 29 to send a notification.

Consequently, if the threshold value is set to a value just short of the upper limit of the steering angular velocity, for example, the operator can recognize that the steering angular velocity is close to its upper limit in a steering operation.

This allows the operator to recognize information related to the upper limit of the steering angular velocity, such as that the steering angular velocity is close to its upper limit, in a steering operation. Therefore, the operator does not have to operate the joystick lever 24 beyond that position, and unnecessary operation can be reduced. Also, since unnecessary operation can thus be reduced, the operator can avoid unnecessarily using the muscles in his hand, which reduces the burden on his body.

(2)

The wheel loader 1 (an example of a work vehicle) in Embodiments 1 to 3 comprises the front frame 11 and the rear frame 12. The rear frame 12 is linked to the front frame 11 by the connecting shaft 13. The steering cylinders 21 and 22 (an example of a hydraulic actuator) are disposed on both sides of the connecting shaft 13 in the vehicle width direction, and change the steering angle θs of the front frame 11 with respect to the rear frame 12.

With an articulated work vehicle such as this, the operator can recognize information related to the upper limit of the steering angular velocity.

(3)

With the wheel loader 1 (an example of a working vehicle) in Embodiments 1 to 3, the angular velocity corresponding value sensing unit 27, 227, or 327 senses a value related to the discharge flow rate of the steering pump 31a (an example of a hydraulic pump) as the corresponding value. The threshold value is the threshold flow rate (an example of a threshold value) preset on the basis of the maximum discharge flow rate of the steering pump 31a at which the steering angular velocity reaches its upper limit. When the controller 28, 228, or 328 senses that the corresponding value has reached the threshold flow rate, the controller 28, 228, or 328 causes the notification component 29 to send a notification.

When the discharge flow rate of the steering pump 31*a* increases, the steering angular velocity also increases, and when the discharge flow rate decreases, the steering angular velocity also decreases.

Since the steering angular velocity thus varies depending on the discharge flow rate of the steering pump 31*a*, information related to the upper limit of the steering angular velocity can be sensed by sensing the discharge flow rate of the steering pump.

(4)

With the wheel loader 1 (an example of a work vehicle) in Embodiment 1, the angular velocity corresponding value sensing unit 27 has the tachometer 121 (an example of an engine speed sensor) and the swash plate angle sensor 122 (an example of a pump information sensor). The tachometer 121 senses the rotational speed of the engine 50 of the wheel loader 1. The swash plate angle sensor 122 senses the angle P$\theta$1 of the swash plate 31*b* of the steering pump 31*a* (an example of a hydraulic pump). The value related to the discharge flow rate of the steering pump 31*a* is the angle of the swash plate 31*b* of the steering pump 31*a*. The threshold value is the threshold value (P$\theta$2−$\delta$) of the angle of the swash plate that is preset on the basis of the angle P$\theta$2 of the swash plate at which the discharge flow rate of the steering pump 31*a* reaches the maximum discharge flow rate with respect to an engine speed. When the angle P$\theta$1 of the swash plate sensed by the swash plate angle sensor 122 at the sensed engine speed reaches the threshold value (P$\theta$2−$\delta$), the controller 28 causes the notification component 29 to send a notification.

Consequently, by acquiring the angle of the swash plate 31*b* of the steering pump 31*a* and the engine speed, it can be determined that the discharge flow rate of the steering pump 31*a* has reached the threshold flow rate, so it can be determined that the steering angular velocity is close to its upper limit.

(5)

The wheel loader 1 (an example of a work vehicle) in Embodiment 2 further comprises the steering valve 32. The steering valve 32 adjusts the flow of fluid supplied from the steering pump 31*a* to the steering cylinders 21 and 22 (an example of a hydraulic actuator) on the basis of the pilot pressure inputted from the pilot valve 42 (an example of a control valve). The pilot valve 42 (an example of a control valve) controls the flow of fluid supplied from the steering pump 31*a* to the steering cylinders 21 and 22 via the steering valve 32 by adjusting the pilot pressure. The angular velocity corresponding value sensing unit 227 has the tachometer 121 (an example of an engine speed sensor) and the load sensing pressure sensor 123 (an example of a load sensing pressure sensor). The tachometer 121 senses the rotational speed of the engine 50 of the wheel loader 1. The load sensing pressure sensor 123 senses the load sensing pressure in the steering valve 32. The value related to the discharge flow rate of the steering pump 31*a* is the load sensing pressure p1 at the steering valve 32. The threshold value is a load sensing pressure threshold value (p2+$\beta$) set in advance on the basis of the load sensing pressure p2 at which the discharge flow rate of the steering pump 31*a* reaches the maximum discharge flow rate with respect to the engine speed. When the load sensing pressure p1 sensed by the load sensing pressure sensor 123 reaches the threshold (p2+$\beta$) at the sensed engine speed, the controller 228 causes the notification component 29 to send a notification.

Consequently, by acquiring the engine speed and the load sensing pressure at the steering valve 32, it can be determined that the discharge flow rate of the steering pump 31*a* has reached the threshold flow rate, so it can be determined that the steering angular velocity is close to its upper limit.

(6)

In the wheel loader 1 (an example of a work vehicle) in Embodiment 3, the angular velocity corresponding value sensing unit 327 has the tachometer 121 (an example of a an engine speed signal), the first rotation angle sensor 101 (an example of a target steering angle sensor), and the second rotation angle sensor 102 (an example of an actual steering angle sensor). The tachometer 121 senses the rotational speed of the engine 50 of the wheel loader 1. The first rotation angle sensor 101 senses the target steering angle $\theta$in inputted with the joystick lever 24 (an example of an operation member). The second rotation angle sensor 102 senses the actual steering angle $\theta$s (=$\theta$fb) that is varied by the steering cylinders 21 and 22 (an example of a hydraulic actuator). The values related to the discharge flow rate of the steering pump 31*a* are the target steering angle $\theta$in and the actual steering angle $\theta$s (=$\theta$fb). The controller 328 has the calculator 156. The calculator 156 calculates the deviation angle $\alpha$ ($\theta$4 in FIG. 19) from the values sensed by the first rotation angle sensor 101 and second rotation angle sensor 102. The threshold value is the threshold value ($\theta$5−$\gamma$) of the deviation angle preset on the basis of the deviation angle $\theta$5 at which the discharge flow rate of the steering pump 31*a* reaches the maximum discharge flow rate with respect to the engine speed. When the deviation angle $\theta$4 reaches the threshold value ($\theta$5−$\gamma$) at the sensed engine speed, the controller 328 causes the notification component 29 to send a notification.

Thus, by acquiring the deviation angle and the engine speed, it can be determined that the threshold value preset on the basis of the maximum discharge flow rate of the steering pump 31*a* has been reached, so the operator can be notified that the steering angular velocity is close to its upper limit.

(7)

With the wheel loader 1 (an example of a work vehicle) in Embodiments 1 to 3, the notification component 29 is disposed at the joystick lever 24, and has the vibrator 171 and the motor 172 for vibrating the vibrator 171.

This allows the operator to recognize information related to the upper limit of the steering angular velocity from vibration.

(8)

With the wheel loader 1 (an example of a work vehicle) in Embodiments 1 to 3, the notification component 29 notifies the operator by light or sound.

The notification component 29 has, for example, a lighting unit, a sounder, or the like, and the operator can recognize from light or sound that the steering angular velocity has reached its upper limit. Light and sound may also be used in combination. Also, if there is a display screen, a display may be used for the light.

(9)

With the wheel loader 1 (an example of a work vehicle) in Embodiments 1 to 3, the pilot valve 42 (an example of a control valve) is mechanically linked to the joystick lever 24 (an example of an operation member).

This allows the operator to directly feel the operation of the pilot valve 42.

(10)

The method for controlling the wheel loader 1 (an example of a work vehicle) in Embodiments 1 to 3 comprises the step S10, S20, S110, S120, S210, or S220 (an example of an angular velocity corresponding value acquisition step), the step S30, S130, or S230 (an example of a determination step), and the step S60, 160, or 260 (an example of a notification step). Step S10, S20, S110, S120, S210, or S220 (an example of the angular velocity corresponding value obtaining step) involves sensing a corresponding value that corresponds to the steering angular velocity when the steering angle θs is changed by operating the joystick lever 24 (an example of an operation member). Step S30, S130, or S230 (an example of a determination step) involves determining that the corresponding value has reached a threshold preset on the basis of the upper limit of the steering angular velocity. Step S60, S160, or S260 (an example of a notification step) involves notifying that the corresponding value has reached the threshold value.

This allows the operator to recognize that the steering angular velocity is close to its upper limit in a steering operation by setting the threshold value just short of the upper limit of the steering angular velocity, for example.

In this manner, the operator can recognize information related to the upper limit of the steering angular velocity, such as that the steering angular velocity is close to its upper limit in a steering operation. Therefore, the operator does not operate the joystick lever 24 beyond that position, and unnecessary operation can be reduced. Also, since unnecessary operation can thus be reduced, the operator can avoid unnecessarily using the muscles in his hand, which reduces the burden on his body.

Other Embodiments

Embodiments of the present invention were described above, but the present invention is not limited to or by the above embodiments, and various modifications are possible without departing from the gist of the invention.

(A)

In the above embodiments, the operator is notified by the notification component 29 that the steering angular velocity has reached its upper limit by means of the motor 172 and the vibrator 171 disposed on the joystick lever 24, but this is not the only option.

(A-1)

For example, light or sound may be used to notify the operator that the steering angular velocity has reached its upper limit. For instance, the wheel loader 1 may have a lighting unit, a sounder, or the like in the cab 5, and the operator can recognize that the steering angular velocity has reached its upper limit by means of light or sound. Light and sound may also be used in combination. Also, if there is a display screen, a display may be used as the light.

(A-2)

Also, when a configuration that assists (or counter-assists) the operation of the joystick lever 24 is provided between the joystick lever 24 and the pilot valve 42, that configuration may be used to notify the operator that the steering angular velocity has reached its upper limit.

Figure 20:
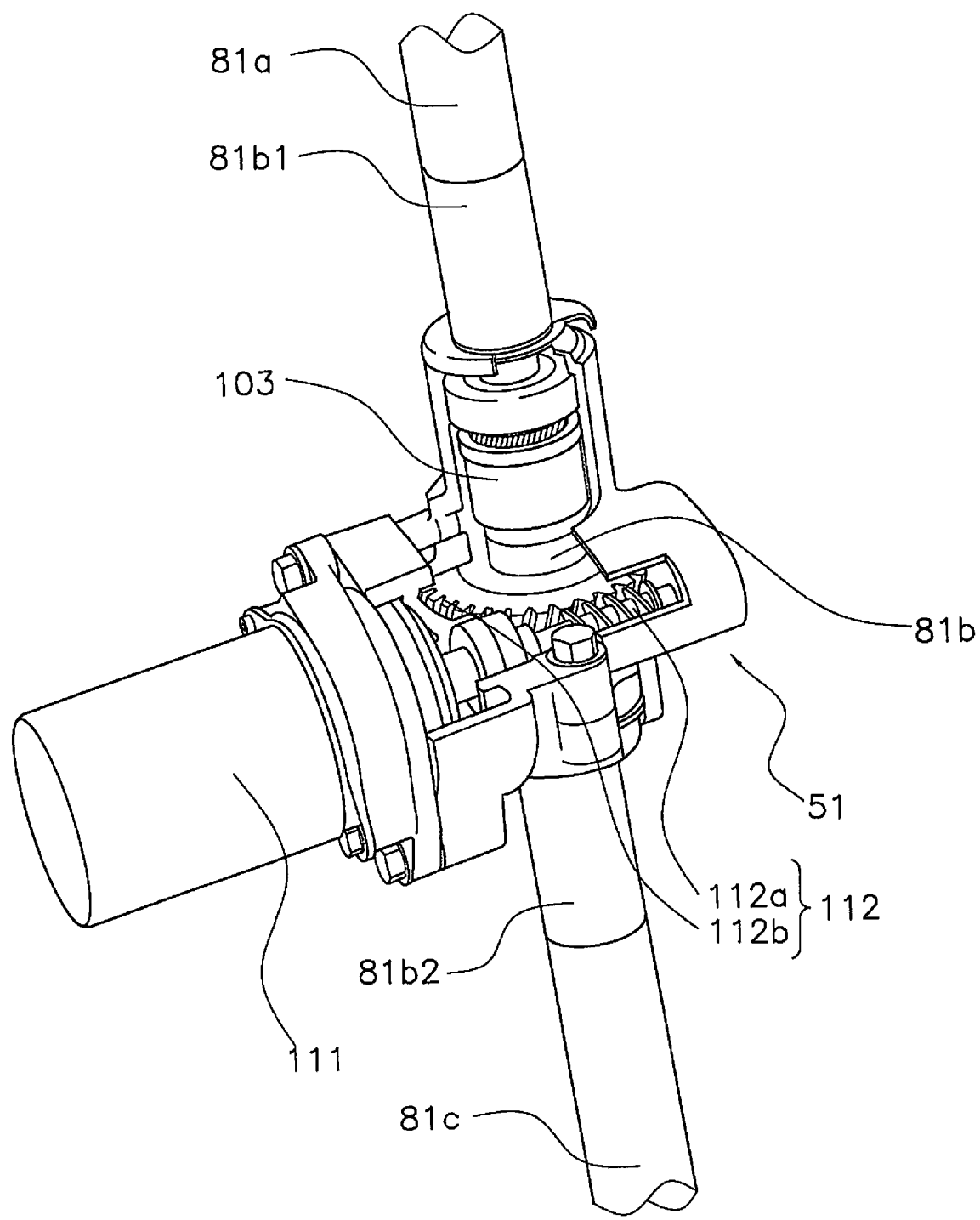
FIG. 20 is an oblique view of a force imparting component, which is a modification example of the notification component in an embodiment of the present invention.

FIG. 20 is an oblique view of a force imparting component 51 for applying an assisting force or a counterforce to the operation of the joystick lever 24. The force imparting component 51 can be disposed so as to apply a force to the steering operation shaft 81 or the operation input shaft 61. In FIG. 20, it is disposed so that a force can be applied to the steering operation shaft 81.

The steering operation shaft 81 includes a lever-side shaft portion 81*a*, an input shaft portion 81*b*, and a valve-side shaft portion 81*c* that are connected in that order. That is, one end of the lever-side shaft portion 81*a* is connected to the connecting bar 82, and the other end of the lever-side shaft portion 81*a* is connected to one end of the input shaft portion 81*b*. Also, the other end of the input shaft portion 81*b* is connected to one end of the valve-side shaft portion 81*c*, and the other end of the valve-side shaft portion 81*c* is connected to a t0 universal joint 83. An assisting force or a counterforce from the force imparting component 51 (discussed below) is inputted to the input shaft portion 81*b*.

The force imparting component 51 applies an assisting force or a counterforce to the operation of the joystick lever 24. The force imparting component 51 has an electric motor 111 and a worm gear 112. The worm gear 112 has a cylindrical worm 112*a* and a worm wheel 112*b*. The worm wheel 112*b* is provided around the input shaft portion 81*b* described above, and meshes with the cylindrical worm 112*a*. The output shaft of the electric motor 111 is connected to the cylindrical worm 112*a*, and rotates the cylindrical worm 112*a* around its central axis. The electric motor 111 is driven on the basis of a command from the controller 28.

The first end 81*b*1 of the input shaft portion 81*b* is connected to the lever-side shaft portion 81*a*, and the second end 81*b*2 is connected to the valve-side shaft portion 81*c*.

When the electric motor 111 is driven, the cylindrical worm 112*a* rotates, the worm wheel 112*b* rotates due to this rotation, and a rotational force is also generated at the input shaft portion 81*b* fixed to the worm wheel 112*b*. The rotation direction of the cylindrical worm 112*a* can be changed to apply a rotational force to the input shaft portion 81*b* in either the left or right rotation direction.

For example, when the joystick lever 24 is rotated to the right, a force is applied to the input shaft portion 81*b* in the right rotation direction, thereby imparting an assisting force to the operation of the joystick lever 24. Also, when the joystick lever 24 is rotated to the right, a counterforce to the operation of the joystick lever 24 is imparted by applying a force in the left rotation direction to the input shaft portion 81*b*.

A torque sensor 103 is provided to the input shaft portion 81*b*. The torque sensor 103 senses torque generated at the input shaft portion 81*b* when the operator applies force to the joystick lever 24. The torque sensor 103 in this embodiment senses the rotation direction of the input shaft portion 81*b* and the torque generated at the input shaft portion 81*b* by sensing the twisting of a torsion bar by means of a coil, for example. The sensed rotation direction and torque T are outputted to the controller 28 as a steering torque signal.

When it is detected by the controller 28, 228, or 328 in Embodiments 1 to 3 that the steering angular velocity has reached its upper limit, the controller 28, 228, or 328 controls the force imparting component 51 so as to produce resistance to the operation of the joystick lever 24. For example, when an assisting force is imparted to the operation of the joystick lever 24, the assisting force can be reduced at the point when the above detection is made, allowing the operator to feel the resistance to the operation of the joystick lever 24. Also, when a counterforce is imparted to the operation of the joystick lever 24, the counterforce can be increased at the point when the above detection is made, allowing the operator to feel the resistance to the operation of the joystick lever 24.

When the force imparting component 51 is used only to notify that the steering angular velocity has reached its upper limit value, the torque sensor 103 need not be provided, and a counterforce may be imparted to the joystick lever 24 at the point when the above detection is made.

(B)

In Embodiments 1 to 3, the configuration is such that the amount of fluid supplied from the steering valve 32 to the steering cylinders 21 and 22 is controlled according to the pilot pressure inputted from the pilot valve 42, which is an example of a control valve, but the configuration may instead be such that fluid from the pilot valve 42 is supplied directly to the steering cylinders 21 and 22.

(C)

In Embodiments 1 to 3, the flow rate to the steering cylinders 21 and 22 is controlled by operating the joystick lever 24, but a joystick lever is not the only option as an example of an operating member, which may instead be a steering wheel.

The configuration may be such that an Orbit Roll (registered trademark) is operated with a steering wheel, and the amount of fluid to the steering cylinders is controlled by the Orbit Roll.

In short, the present invention can be applied to any work vehicle in which the steering angle is changed.

(D)

In the above embodiments, a hydraulic pump that adjusts the discharge flow rate by means of the swash plate 31b is used as a steering pump, but a pump that adjusts the discharge flow rate by means of an inclined shaft may be used instead. In that case, a sensor for sensing the angle of the inclined axis is provided, and the storage component stores a graph of the angle of the inclined shaft at which the discharge flow rate reaches its maximum versus the engine speed.

(E)

In the above embodiments, the wheel loader 1 is used as an example of a work vehicle, but the work vehicle may be an articulated dump truck, motor grader, or the like, and it is not even limited to an articulated type, and may, for example, be a forklift or the like.

(F)

In Embodiments 1 to 3, the two springs (the first spring 64 and the second spring 65) are provided, but the second spring 65 need not be provided. In this case, for example, the feedback spool 73 and the feedback sleeve 74 should be fixed together.

(G)

In Embodiment 1, the specific value δ and information about the angle of the swash plate at which the discharge flow rate of the steering pump 31a reaches its maximum versus engine speed are stored, but it is also possible to store information obtained by subtracting the specific value δ from information about the angle of the swash plate at which the discharge flow rate of the steering pump 31a reaches its maximum. That is, the upper limit swash plate angle determination component 134 determines P$\theta$2' (=P$\theta$2−δ) from the acquired engine speed signal S($\omega$eng), and when the determination component 135 determines that P$\theta$1 is greater than or equal to P$\theta$2', the operator is notified that the discharge amount of the steering pump 31a has reached its maximum.

In Embodiment 2, the specific value β and information about the LS pressure at which the flow rate of the steering pump 31a reaches its upper limit versus engine speed are stored, but it is also possible to store information obtained by adding the specific value β to information about the LS pressure at which the flow rate of the steering pump 31a reaches its upper limit. That is, the upper limit LS pressure determination component 144 determines p2' (=p2+β) from the acquired engine speed signal S($\omega$eng), and when the determination component 145 determines that p1 is less than or equal to p2', the operator is notified that the discharge amount of the pump 31a has reached its maximum.

Also, in Embodiment 3, the specific value γ and information about the deviation angle at which the flow rate of the steering pump 31a reaches its upper limit versus the engine speed are stored, but it is also possible to store information obtained by subtracting the specific value γ from information about the deviation angle at which the flow rate of the steering pump 31a reaches its upper limit. That is, the upper limit deviation angle determination component 154 determines $\theta$5' (=$\theta$5−γ) from the acquired engine speed signal S($\omega$eng), and when the determination component 155 determines that $\theta$4 is greater than or equal to $\theta$5', the operator is notified that the discharge amount of the steering pump 31a has reached the threshold flow rate.

(H)

In Embodiment 3, when the deviation angle $\theta$4 calculated by the calculator 156 is greater than or equal to $\theta$5−γ, it is detected that the discharge flow rate of the steering pump 31a has reached the threshold flow rate and that the steering angular velocity is close to its upper limit, but this is not the only option. For example, the determination component 155 may determine whether or not the deviation angle $\theta$4 is greater than or equal to $\theta$5, and it may be detected that the steering angular velocity has reached its upper limit.

That is, if it is determined whether or not θ4 is greater than or equal to ($\theta$5−γ) as in Embodiment 3, it can be detected that the steering angular velocity is close to its upper limit, that is, that the steering angular velocity will reach its upper limit momentarily. On the other hand, if it is determined whether or not θ4 is greater than or equal to θ5 as in this modification example, it can be detected that the steering angular velocity has reached its upper limit.

(I)

In the above embodiments, the joystick lever 24 and the pilot valve 42 are mechanically connected by the connecting portion 25, but this is not the only option. The joystick lever 24 and the pilot valve may not be mechanically connected, and the operation of the joystick lever 24 may be electrically transmitted to the pilot valve to operate the pilot valve.

Figure 21:
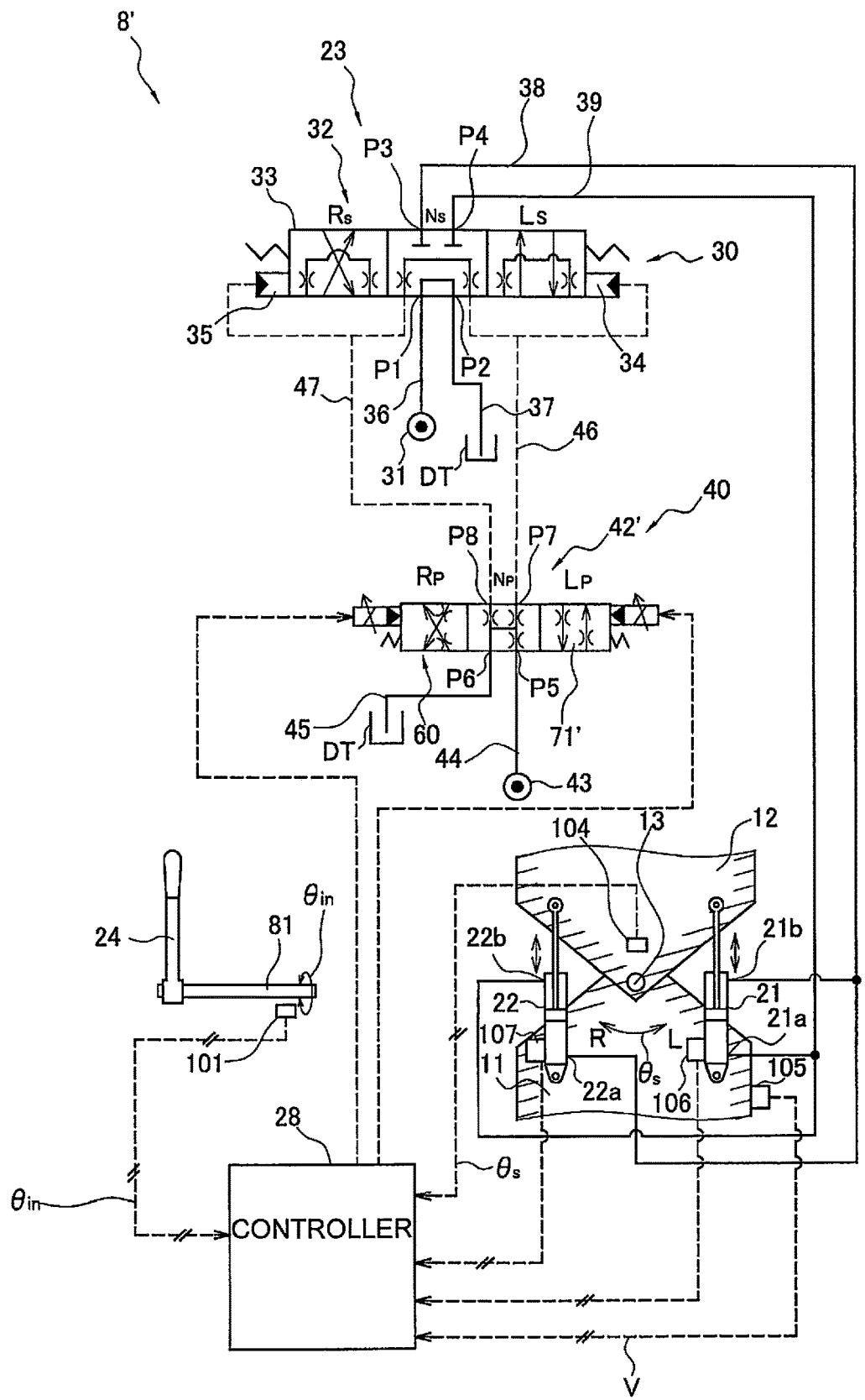
FIG. 21 is a configuration diagram of the steering operation device in a modification example of an embodiment of the present invention.

FIG. 21 is a diagram of a steering operation device 8' as an example of a configuration in which the operation of the joystick lever 24 is electrically transmitted to a pilot valve 42', and is a diagram of a modification example of Embodiment 1. This configuration is also applicable to Embodiments 2 and 3.

The pilot valve 42' shown in FIG. 21 is a spool type instead of a rotary type as in the above embodiments. The pilot valve 42' has a valve body component 60 including a spool 71' and a sleeve (not shown), and the spool 71' can move between the neutral position Np, the left pilot Position Lp, and right pilot position Rp by means of a signal from the controller 28, using the sleeve as a reference.

With the configuration shown in FIG. 21, the universal joint 83 shown in FIG. 5 is not provided, for example. The joystick lever 24 is connected to the steering operation shaft 81. The steering operation shaft 81 is not linked to the pilot valve. Just as in the above embodiments, the first rotation angle sensor 101 senses the rotation angle θin of the steering operation shaft 81 and transmits it to the controller 28.

Also, the link mechanism 26 for linking the pilot valve and the front frame 11 as shown in FIG. 5 may not be provided. The steering angle θs of the front frame 11 with respect to the rear frame 12 is sensed by the steering angle sensor 104 and transmitted to the controller 28.

The controller 28 sends a command to the pilot valve 42' to control the movement of the spool 71' of the pilot valve 42' on the basis of the received information about the rotation angle θin and the steering angle θs. The movement of the spool 71' changes the pilot pressure that is supplied from the pilot valve 42' to the steering valve 32, and changes the amount of fluid supplied from the steering valve 32 to the steering cylinders 21 and 22. As a result, a steering operation is performed. At this point, the controller 28 may control so that the rotation angle θin matches the steering angle θs by controlling the pilot pressure so that the difference between θin and θs is reduced.

The configuration in which the operation of the joystick lever 24 is electrically transmitted to the pilot valve may be applied to a configuration in which the force imparting component 51 in the above modification example (A-2) is provided. A steering operation device 208' is shown in FIG. 22 as an example of this.

Figure 22:
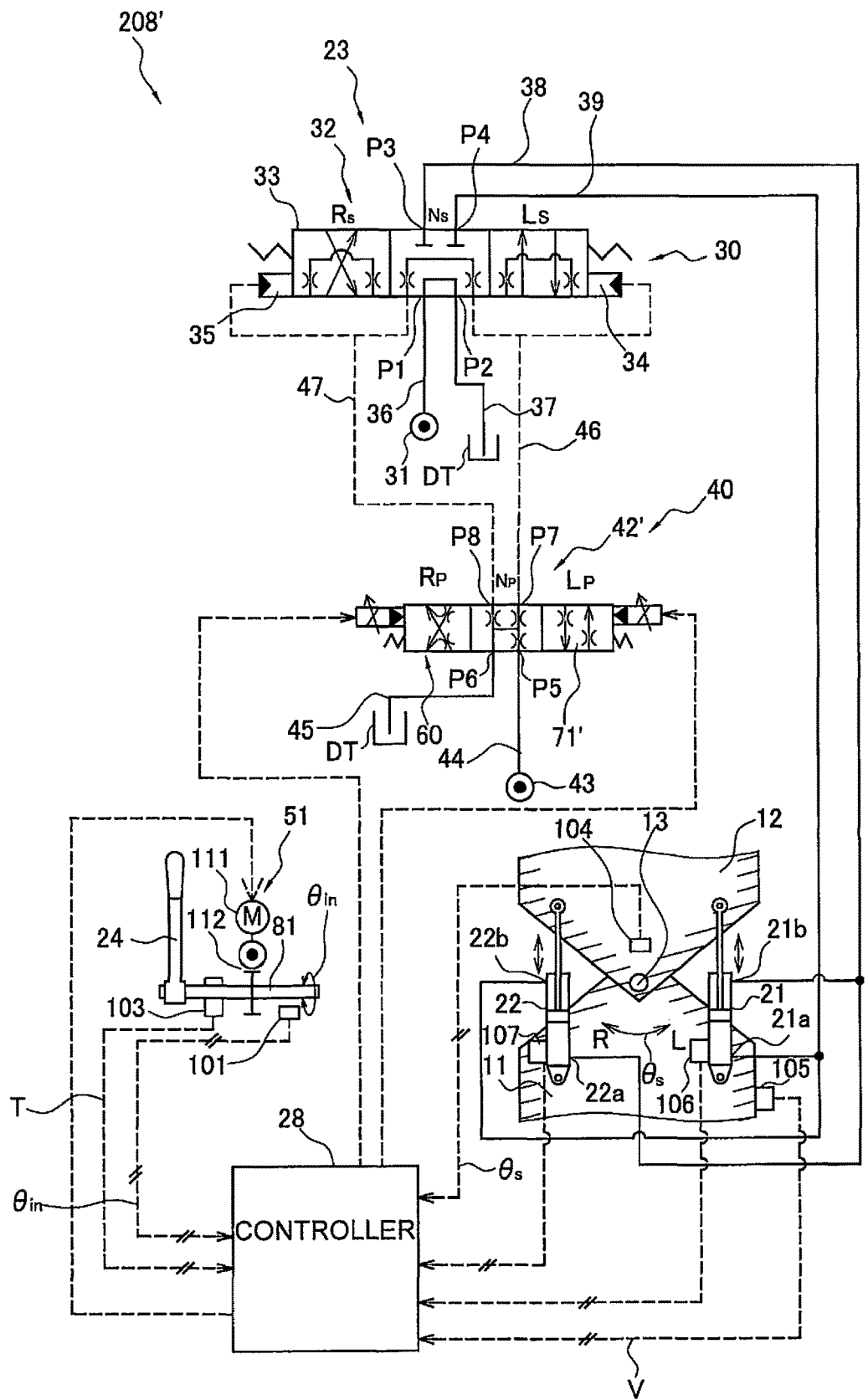
FIG. 22 is a configuration diagram of the steering operation device in a modification example of an embodiment of the present invention.

The steering operation device 208' shown in FIG. 22 differs from the steering operation device 8' shown in FIG. 21 in that it is provided with a torque sensor 103 for sensing the torque generated at the steering operation shaft 81, and a force imparting component 51 for imparting an assisting force or a counterforce to the steering operation shaft 81.

Figure 23:
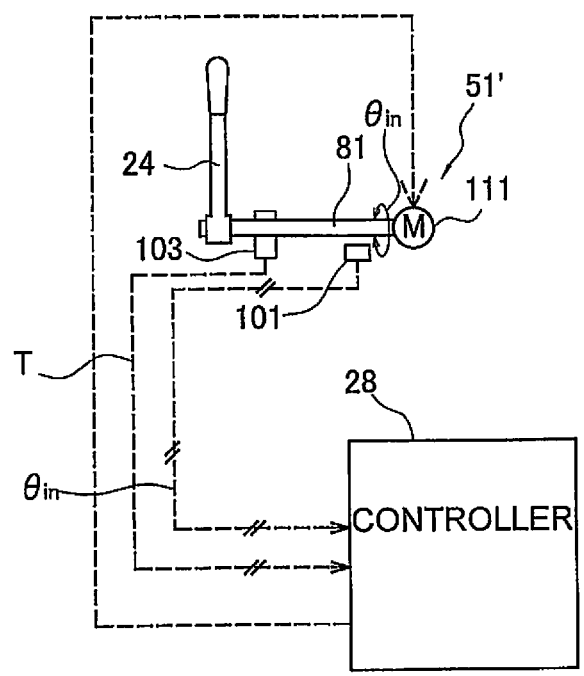
FIG. 23 is a configuration diagram of a modification example of the force imparting component in FIG. 22.

With the steering operation device 208', the force of the electric motor 111 is transmitted to the steering operation shaft 81 by the worm gear 112, but as in the force imparting component 51' shown in FIG. 23, the rotary shaft of the electric motor 111 may be directly connected to the steering operation shaft 81, without the worm gear 112 or other such reduction gear device being interposed.

With the steering operation device 8 shown in FIG. 5, the joystick lever 24 itself is able to rotate to the inside or the outside of the driver's seat around a vertical axis. The joystick lever 24 of the steering operation devices 8' and 208' shown in FIGS. 21 and 22 may itself be rotatable to the inside or outside of the driver's seat around a horizontal axis. In other words, the pilot valve 42' may be actuated on the basis of operation of the joystick lever 24, and when the force imparting component 51 is provided, the configuration may be such that the force from the force imparting component 51 can be transmitted to the joystick lever 24.

As described above, electrical transmission may be performed either by wire or wirelessly.

The working vehicle and working vehicle control method of the present invention have the effect of allowing an operator to be notified that the steering angular velocity has reached its upper limit, and are useful with a wheel loader, a forklift, and the like.

The invention claimed is:

1. A work vehicle, comprising:
an engine;
a hydraulic actuator configured to change a steering angle of the work vehicle in response to a fluid supplied to the hydraulic actuator;
a hydraulic pump configured to supply the fluid to the hydraulic actuator;
an operating member configured to be operated by an operator to change the steering angle;
a control valve configured to control a flow of the fluid supplied from the hydraulic pump to the hydraulic actuator, based on an amount the operating member is operated;
an angular velocity corresponding value sensing unit comprising a tachometer and a first sensor, the tachometer being configured to detect a rotational speed of the engine and the first sensor being configured to detect a first value related to a discharge flow rate of the hydraulic pump;
a controller arranged to receive a signal indicating the rotational speed of the engine from the tachometer and a signal indicating the first value from the first sensor, the controller being configured to determine whether the first value has reached a threshold value set based on a relationship indicating the discharge flow rate of the hydraulic pump with respect to the rotational speed of the engine; and
a notification component configured to perform a notification to notify the operator that the first value has reached the threshold value,
the controller being configured to cause the notification component to perform the notification when the controller determines that the first value has reached the threshold value.

2. The work vehicle according to claim 1, further comprising:
a front frame; and
a rear frame linked to the front frame at a connecting shaft portion,
the hydraulic actuator being disposed on both sides of the connecting shaft portion along a vehicle width direction, and the hydraulic actuator being configured to change the steering angle of the front frame with respect to the rear frame.

3. The work vehicle according to claim 1, wherein
the relationship indicates a maximum discharge flow rate of the hydraulic pump at which a steering angular velocity reaches an upper limit with respect to the rotational speed of the engine.

4. The work vehicle according to claim 3, wherein the first sensor is a pump information sensor configured to detect an angle of a swash plate of the hydraulic pump or an angle of an inclined shaft of the hydraulic pump,
the first value is the angle of the swash plate or the angle of the inclined shaft,
the relationship indicates the angle of the swash plate or the angle of the inclined shaft at which the discharge flow rate of the hydraulic pump reaches the maximum discharge flow rate with respect to the rotational speed of the engine.

5. The work vehicle according to claim 3, further comprising:
a steering valve configured to adjust a flow rate of the fluid supplied from the hydraulic pump to the hydraulic actuator based on a pilot pressure inputted from the control valve,
the control valve being configured to control the flow rate of the fluid supplied from the hydraulic pump to the hydraulic actuator via the steering valve by adjusting the pilot pressure,
the first sensor being a load sensing pressure sensor configured to detect a load sensing pressure in the steering valve,
the first value being the load sensing pressure in the steering valve,
the relationship indicates a load sensing pressure at which the discharge flow rate of the hydraulic pump reaches the maximum discharge flow rate with respect to the rotational speed of the engine.

6. The work vehicle according to claim 3, further comprising
a second sensor configured to detect a second value related to the discharge flow rate of the hydraulic pump, the first sensor being a target steering angle sensor configured to sense a target steering angle inputted with the operating member,
the second sensor being an actual steering angle sensor configured to sense an actual steering angle changed by the hydraulic actuator,
the first and second values are the target steering angle and the actual steering angle, respectively,
the controller includes a calculator configured to calculate a deviation angle from the first value and the second value,
the relationship indicates a deviation angle at which the discharge flow rate of the hydraulic pump reaches the maximum discharge flow rate with respect to the rotational speed of the engine, and
the controller is configured to cause the notification component to perform the notification when the calculated deviation angle reaches the threshold value at the rotation speed detected by the tachometer.

7. The work vehicle according to claim 1, wherein
the operating member is a joystick lever, and
the notification component is disposed on the joystick lever, and the notification component includes a vibrator and a motor to vibrate the vibrator.

8. The work vehicle according to claim 1, wherein
the notification component notifies an operator with light or sound.

9. The work vehicle according to claim 1, wherein
the notification component includes a force imparting component configured to impart an assisting force or a counterforce to an operation of the operating member, and
the notification to an operator is performed with an imparted force.

10. The working vehicle according to claim 1, wherein
the control valve is mechanically linked to the operating member.

11. A method for controlling a work vehicle that includes:
an engine;
a hydraulic actuator configured to change a steering angle of the work vehicle in response to a fluid supplied to the hydraulic actuator;
a hydraulic pump configured to supply the fluid to the hydraulic actuator;
an operating member configured to be operated by an operator of the work vehicle to change the steering angle;
a control valve configured to control a flow of the fluid supplied from the hydraulic pump to the hydraulic actuator, based on an amount the operating member is operated;
an angular velocity corresponding value sensing unit comprising a tachometer and a first sensor, the tachometer being configured to detect a rotational speed of the engine and the first sensor being configured to detect a first value related to a discharge flow rate of the hydraulic pump;
a controller arranged to receive a signal indicating the rotational speed of the engine from the tachometer and a signal indicating the first value from the first sensor; and
a notification component configured to perform a notification to notify the operator regarding the first value,
the method comprising utilizing the controller to:
acquire the rotational speed of the engine and the first value;
determine whether the first value has reached a threshold value set based on a relationship indicating the discharge flow rate of the hydraulic pump with respect to the rotational speed of the engine; and
cause the notification component to notify the operator that the first value has reached the threshold value when it is determined that the first value has reached the threshold value.

12. The method according claim 11, wherein
the relationship indicates a maximum discharge flow rate of the hydraulic pump at which a steering angular velocity of the work vehicle reaches an upper limit with respect to the rotational speed of the engine.

13. The method according to claim 11, further comprising utilizing the controller to:
acquire a second value related to the discharge flow rate of the hydraulic pump;
calculate a deviation between the first value and the second value; and
determine whether the deviation has reached the threshold value.

* * * * *